(12) United States Patent
Kim et al.

(10) Patent No.: US 8,780,843 B2
(45) Date of Patent: Jul. 15, 2014

(54) METHOD AND APPARATUS FOR TRANSMITTING A SOUNDING REFERENCE SIGNAL

(75) Inventors: Hak Seong Kim, Anyang-si (KR); Han Byul Seo, Anyang-si (KR); Byoung Hoon Kim, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 51 days.

(21) Appl. No.: 13/517,945

(22) PCT Filed: Feb. 7, 2011

(86) PCT No.: PCT/KR2011/000766
§ 371 (c)(1),
(2), (4) Date: Jun. 20, 2012

(87) PCT Pub. No.: WO2011/096755
PCT Pub. Date: Aug. 11, 2011

(65) Prior Publication Data
US 2012/0287882 A1 Nov. 15, 2012

Related U.S. Application Data

(60) Provisional application No. 61/302,081, filed on Feb. 5, 2010.

(51) Int. Cl.
*H04W 4/00* (2009.01)
(52) U.S. Cl.
USPC .......................................... 370/329; 370/328
(58) Field of Classification Search
None
See application file for complete search history.

(56) References Cited

U.S. PATENT DOCUMENTS

| | | | |
|---|---|---|---|
| 2008/0139237 A1* | 6/2008 | Papasakellariou | 455/522 |
| 2008/0267269 A1 | 10/2008 | Enescu et al. | |
| 2009/0109908 A1 | 4/2009 | Bertrand et al. | |
| 2009/0239476 A1 | 9/2009 | Womack et al. | |
| 2009/0285193 A1* | 11/2009 | Kim et al. | 370/342 |
| 2009/0303955 A1* | 12/2009 | Teo et al. | 370/329 |
| 2009/0323664 A1* | 12/2009 | Li et al. | 370/344 |

FOREIGN PATENT DOCUMENTS

KR 1020080112115 12/2008

OTHER PUBLICATIONS

PCT International Application No. PCT/KR2011/000766, Written Opinion of the International Searching Authority dated Oct. 21, 2011, 17 pages.

* cited by examiner

*Primary Examiner* — David Oveissi
(74) *Attorney, Agent, or Firm* — Lee, Hong, Degerman, Kang & Waimey

(57) ABSTRACT

The present invention relates to a method for transmitting a sounding reference signal and to an apparatus for said method. More particularly, the present invention relates to a method for transmitting a sounding reference signal and to an apparatus for said method, wherein the method comprising the following steps: receiving sounding reference signal parameters; allocating a wireless resource using the sounding reference signal parameters; and transmitting a sounding reference signal via the wireless resource, wherein said sounding reference signal is transmitted using a portion of a period of a single carrier-frequency division multiple access (SC-FDMA) symbol.

15 Claims, 55 Drawing Sheets

FIG. 17
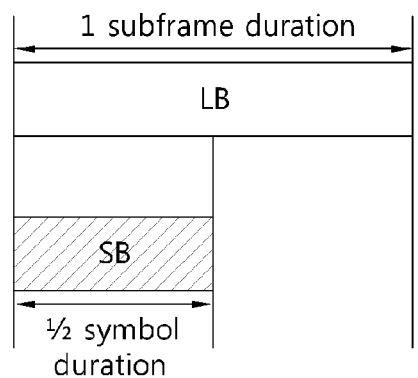
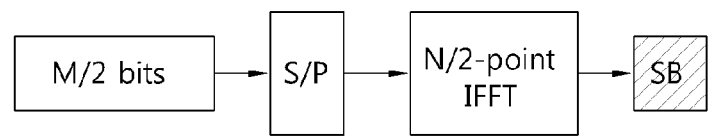
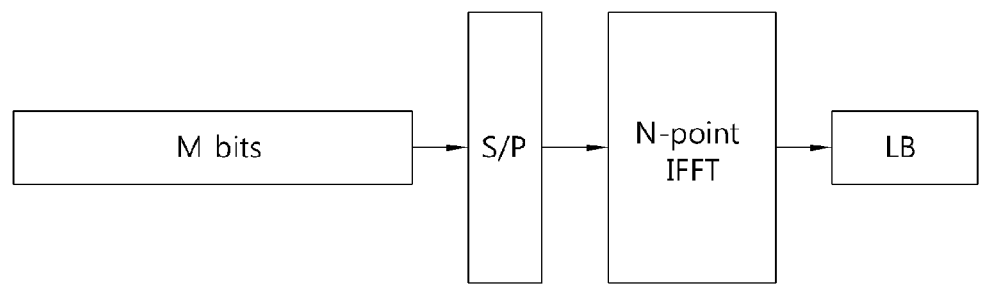

(a) Case in which relay UE UL TX is delayed (b) Case in which relay UE UL TX is leading

METHOD AND APPARATUS FOR TRANSMITTING A SOUNDING REFERENCE SIGNAL

CROSS-REFERENCE TO RELATED APPLICATIONS

This application is the National Stage filing under 35 U.S.C. 371 of International Application No. PCT/KR2011/000766, filed on Feb. 7, 2011, which claims the benefit of U.S. Provisional Application Ser. No. 61/302,081, filed on Feb. 5, 2010, the contents of which are all incorporated by reference herein in their entirety.

FIELD OF THE INVENTION

The present invention relates to wireless communication, and more particularly to a method and apparatus for transmitting a sounding reference signal.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). For example, A variety of multiple access systems such as a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single-Carrier Frequency Division Multiple Access (SC-FDMA) system, a Multi-Carrier Frequency Division Multiple Access (MC-FDMA) system, and the like can be used.

DETAILED DESCRIPTION OF THE INVENTION

Technical Problem

An object of the present invention devised to solve the problem lies in a method and apparatus for efficiently transmitting a sounding reference signal in a wireless communication system. In more detail, an object of the present invention devised to solve the problem lies in a method and apparatus for efficiently transmitting a sounding reference signal in a wireless communication system including a relay node (RN).

It is to be understood that technical objects to be achieved by the present invention are not limited to the aforementioned technical objects and other technical objects which are not mentioned herein will be apparent from the following description to persons skilled in the art to which the present invention pertains.

Technical Solution

In an aspect of the present invention, a method for transmitting a sounding reference signal (SRS) of a user equipment (UE) in a wireless communication system includes receiving sounding reference signal (SRS) parameters; allocating radio resources using the sounding reference signal (SRS) parameters; and transmitting a sounding reference signal (SRS) using the radio resources, wherein the sounding reference signal (SRS) is transmitted using a portion of a single carrier-frequency division multiple access (SC-FDMA) symbol.

In another aspect of the present invention, a user equipment (UE) includes a radio frequency (RF) unit for transmitting/receiving a radio frequency (RF) signal; and a processor connected to the RF unit, wherein the processor receives sounding reference signal (SRS) parameters, allocates radio resources using the sounding reference signal (SRS) parameters, and transmits a sounding reference signal (SRS) using the radio resources, wherein the sounding reference signal (SRS) is transmitted using a portion of a single carrier-frequency division multiple access (SC-FDMA) symbol.

The sounding reference signal (SRS) may be transmitted using one of half portions of the SC-FDMA symbol.

The sounding reference signal (SRS) may occupy the front half portion of the SC-FDMA symbol, and may be comprised of a short block (SB) having subcarrier spacing that is two times larger than that of a symbol including no SRS.

The sounding reference signal (SRS) may occupy the rear half portion of the SC-FDMA symbol, and may be comprised of a short block (SB) having subcarrier spacing that is two times larger than that of a symbol including no SRS.

The SRS parameters may include a parameter indicating a sounding band in which the sounding reference signal (SRS) is transmitted, and the parameter indicating the sounding band indicates all or some of a system band.

The SC-FDMA symbol may be the last SC-FDMA symbol of a subframe.

The method may further include receiving information indicating the position of the sounding reference signal (SRS) located in the SC-FDMA symbol.

In another aspect of the present invention, a method for receiving a sounding reference signal (SRS) of a network node in a wireless communication system includes transmitting sounding reference signal (SRS) parameters to a user equipment (UE); and receiving a sounding reference signal (SRS) from the user equipment (UE) using radio resources indicated by the sounding reference signal (SRS) parameters, wherein the sounding reference signal (SRS) is received using a portion of a single carrier-frequency division multiple access (SC-FDMA) symbol.

In another aspect of the present invention, a network node includes a radio frequency (RF) unit for transmitting/receiving a radio frequency (RF) signal; and a processor connected to the RF unit, wherein the processor transmits sounding reference signal (SRS) parameters to a user equipment (UE), and receives a sounding reference signal (SRS) from the user equipment (UE) using the radio resources indicated by the SRS parameters, wherein the sounding reference signal (SRS) is received using a portion of a single carrier-frequency division multiple access (SC-FDMA) symbol. The network node includes a base station (BS) or a relay.

The sounding reference signal (SRS) may be received using one of half portions of the SC-FDMA symbol.

The sounding reference signal (SRS) may occupy the front half portion of the SC-FDMA symbol, and may be comprised of a short block (SB) having subcarrier spacing that is two times larger than that of a symbol including no SRS.

The sounding reference signal (SRS) may occupy the rear half portion of the SC-FDMA symbol, and may be comprised of a short block (SB) having subcarrier spacing that is two times larger than that of a symbol including no SRS.

The SRS parameters may include a parameter indicating a sounding band in which the SRS is transmitted, and the parameter indicating the sounding band indicates all or some of a system band.

The SC-FDMA symbol may be the last SC-FDMA symbol of a subframe.

The method may include receiving information indicating the position of SRS located in the SC-FDMA symbol.

Effects of the Invention

As is apparent from the above description, exemplary embodiments of the present invention can provide a method and apparatus for efficiently transmitting a sounding reference signal in a wireless communication system. In more detail, the exemplary embodiments of the present invention provide a method and apparatus for efficiently transmitting a sounding reference signal in a wireless communication system including a relay node.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention. In the drawings:

FIG. 17 is a conceptual diagram illustrating comparison of a short block (SB) and a long block (LB) and a method for generating a short block;

BEST MODE FOR CARRYING OUT THE INVENTION

The preferred embodiments of the present invention will now be described in detail with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, and the like. CDMA can be implemented with radio technologies, such as Universal Terrestrial Radio Access (UTRA) or CDMA2000. TDMA can be implemented by wireless communication technologies, for example, a Global System for Mobile communications (GSM), a General Packet Radio Service (GPRS), an Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of a Universal Mobile Telecommunications System (UMTS). 3rd Generation Partnership Project (3GPP) Long Term Evolution (LTE) is a part of an Evolved UMTS (E-UMTS) that uses an E-UTRA, and employs OFDMA in downlink and SC-FDMA in uplink. LTE-Advanced (LTE-A) is an evolved version of 3GPP LTE. Although the following embodiments of the present invention will hereinafter describe inventive technical characteristics on the basis of the 3GPP LTE/LTE-A systems, it should be noted that the following embodiments will be disclosed only for illustrative purposes and the scope and spirit of the present invention are not limited thereto.

Figure 1:
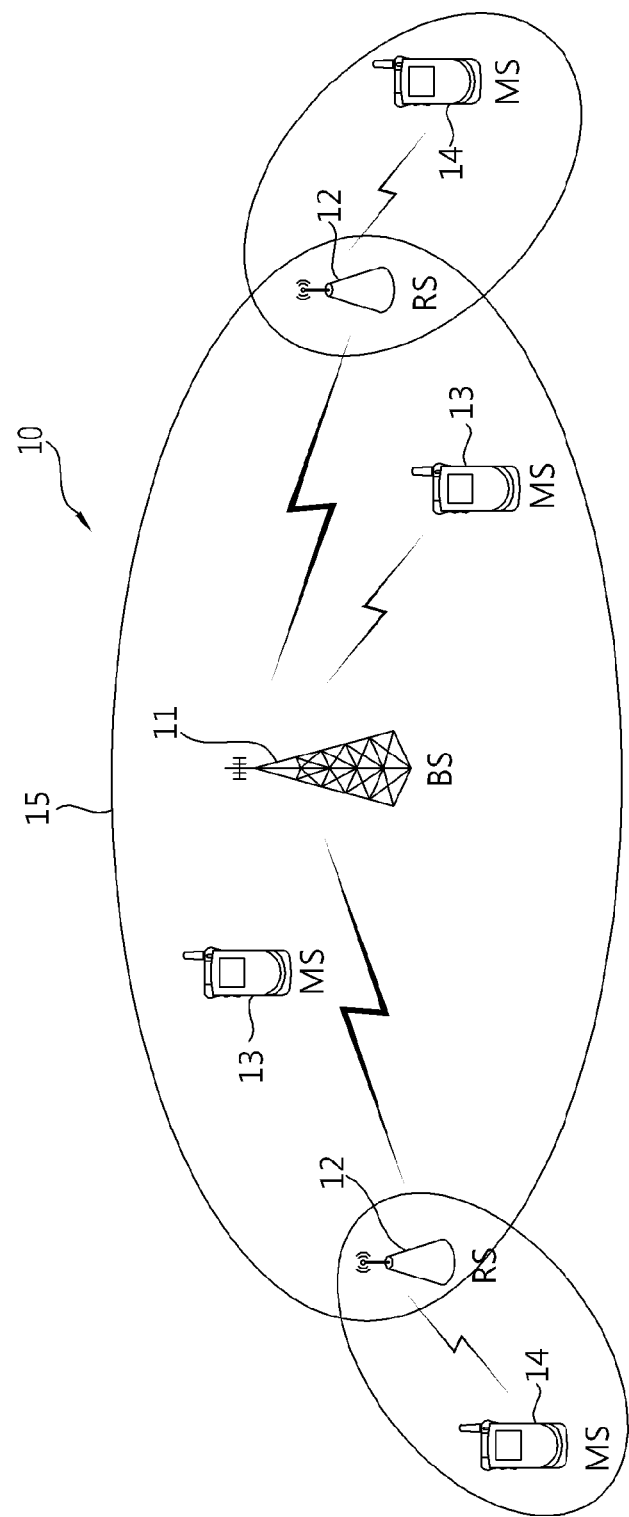
FIG. 1 exemplarily shows a wireless communication system including a relay node (RN)

FIG. 1 exemplarily shows a wireless communication system including a relay node (RN).

Referring to FIG. 1, a wireless communication system 10 including a relay node (RN) includes at least one base station (BS) 11. Each BS 11 provides a communication service to a specific geographical region 15 called a cell. Each cell can be divided into a plurality of regions, and each region is called a sector. One BS may include one or more cells. The BS 11 is a fixed station communicating with a UE 13, and may also be called in other terms, for example, an evolved Node B (eNB), a base transceiver system (BTS), an access point (AP), an access network (AN), and the like. The BS 11 can perform a variety of functions between a relay node (RN) 12 and a UE 14, for example, connectivity, management, control and resource allocation functions between the RN 12 and the UE 14.

The relay node (RN) (also called a relay station RS 12) is a device for relaying signals between the BS 11 and the UE 14. If necessary, the RN may also be called a repeater, a relay station (RS), a relay, or the like. The RN is able to use a variety of relaying schemes, for example, amplify-and-forward (AF) and decode-and-forward (DF) schemes. The technical scope or spirit of the present invention is not limited thereto.

The UE 13 or 14 may denote a mobile or fixed type user terminal. The UE may be referred to as a Mobile Station (MS), a User Terminal (UT), a Subscriber Station (SS), a wireless device, a Personal Digital Assistant (PDA), a wireless modem, a handheld device, or an access terminal (AT). In the following description, a macro UE (Ma UE) 13 is a terminal capable of directly communicating with the BS 11 and a relay UE (Re UE) 14 is a terminal capable of communicating with a relay. The macro UE 13 existing in a cell of the BS 11 can communicate with the BS 11 through the relay node (RN) 12 so as to increase a transfer rate based on a diversity effect.

A link between the BS 11 and the macro UE 13 will hereinafter be referred to as a macro link. The macro link can be classified into a macro downlink (M-DL) and a macro uplink (M-UL). The M-DL indicates communication from the BS 11 to the macro UE 13, and the M-UL indicates communication from the macro UE 13 to the BS 11.

The link between the BS 11 and the RN 12 will hereinafter be referred to as a backhaul link. The backhaul link can be classified into a backhaul downlink (B-DL) and a backhaul uplink (B-UL). The B-DL indicates communication from the BS 11 to the RN 12, and the B-UL indicates communication from the RN 12 to the BS 11.

A link between the RN 12 and the RN-UE 14 will hereinafter be referred to as an access link. The access link can be classified into an access downlink (A-DL) and an access uplink (A-UL). The A-DL indicates communication from the RN 12 to the RN-UE 14, and the A-UL indicates communication from the RN-UE 14 to the RN 12.

A wireless communication system 10 including a relay node (RN) may support bidirectional (two-way) communication. The bidirectional communication may be carried out using a time division duplex (TDD) mode, a frequency division duplex (FDD) mode, and the like. The TDD mode uses different time resources in UL and DL transmission. The FDD mode uses different frequency resources in UL and DL transmission.

Figure 2:
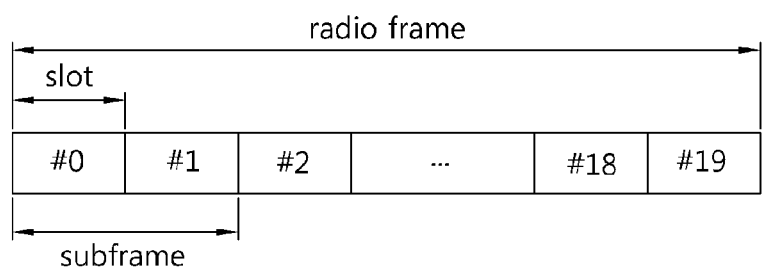
FIG. 2 exemplarily shows a radio frame structure for use in a 3rd Generation Partnership Project (3GPP) LTE system.

FIG. 2 exemplarily shows a radio frame structure for use in a 3rd Generation Partnership Project (3GPP) LTE system.

Referring to FIG. 2, a radio frame includes 10 subframes, and one subframe includes two slots. One subframe has 1 ms long and one slot has 0.5 ms long. A time required for transmitting one subframe is denoted by a transmission time interval (TTI). TTI may be a minimum unit of scheduling.

One slot may include a plurality of OFDM symbols in a time domain. Since the 3GPP LTE uses OFDMA in downlink, one OFDM symbol represents one symbol period. If necessary, the OFDM symbol may also be called in other terms. For example, if SC-FDMA is used as the uplink multiple access scheme, the corresponding symbol may also be called an SC-FDMA symbol. Although one slot includes 7 OFDM symbols as an example, it should be noted that the number of OFDM symbols contained in one slot may be changed according to the length of a cyclic prefix (CP). According to 3GPP TS 36.211 V8.5.0 (2008-12), one subframe for use in a normal CP includes 7 OFDM symbols, and one subframe for use in an extended CP includes 6 OFDM symbols. The aforementioned structure of the radio frame is only exemplary, and various modifications can be made to the number of subframes contained in the radio frame, the number of slots contained in each subframe, or the number of OFDM symbols contained in each slot.

The radio frame structure shown in FIG. 2 may refer to 4.1 and 4.2 paragraphs of 3GPP TS 36.211 V8.3.0 (2008-05) "Technical Specification Group Radio Access Network; Evolved Universal Terrestrial Radio Access (E-UTRA); Physical Channels and Modulation (Release 8)".

Figure 3:
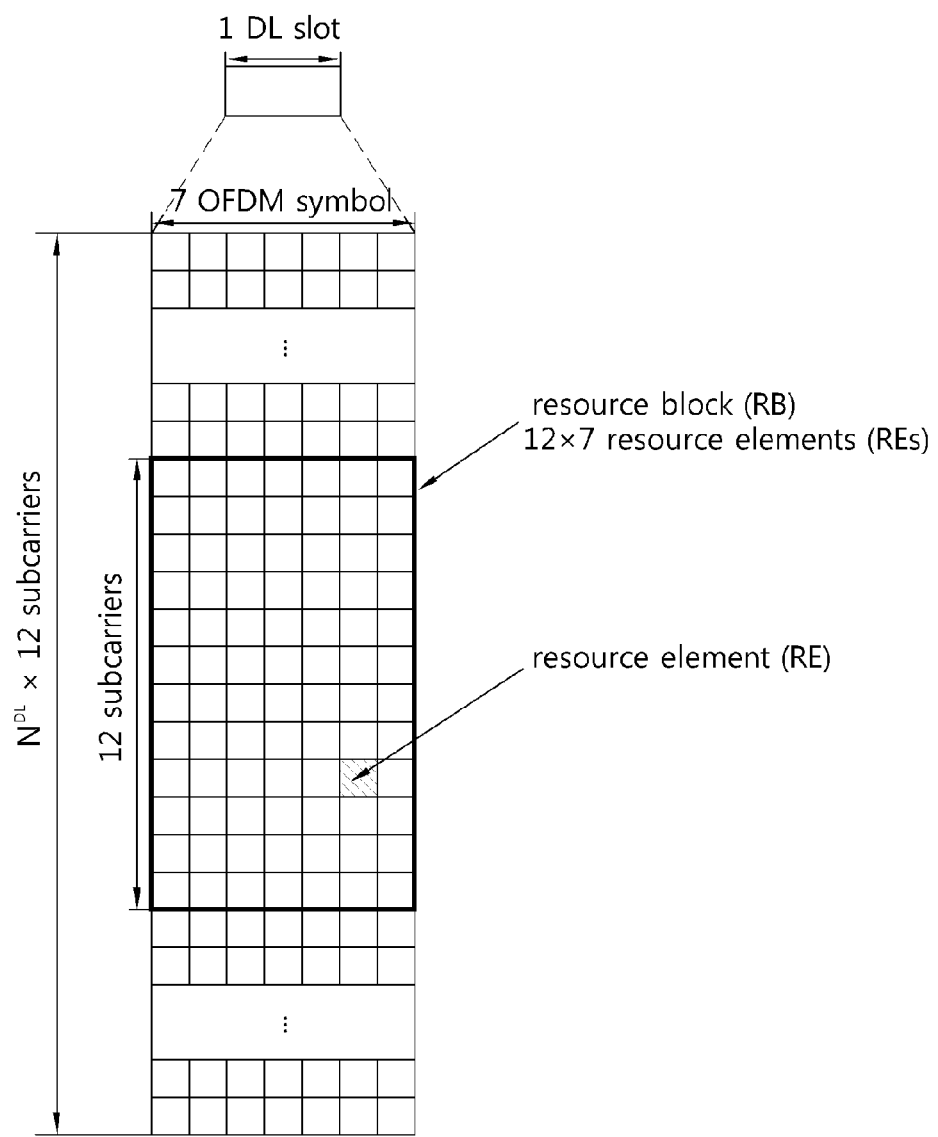
FIG. 3 exemplarily shows a resource grid of a single downlink (DL) slot.

FIG. 3 exemplarily shows a resource grid of a single downlink (DL) slot.

Referring to FIG. 3, in the FDD or TDD radio frame, one slot includes a plurality of OFDM symbols in a time domain and includes a plurality of resource blocks (RBs) in a frequency domain. In the following description, a symbol may denote one OFDM symbol or one SC-FDMA symbol. A resource block (RB) may include a plurality of consecutive subcarriers in a single slot in units of resource allocation.

Referring to FIG. 3, a slot (for example, a downlink slot contained in a downlink subframe) includes a plurality of OFDM symbols in a time domain. Although one DL slot exemplarily includes 7 OFDM symbols and one RB exemplarily includes 12 subcarriers in a frequency domain, the scope and spirit of the present invention is not limited thereto. For example, a subcarrier of a resource block (RB) may have a spacing of 15 KHz.

Each element of a resource grid is called a resource element (RE), and one RB may include 12×7 REs. The number $N^{DL}$ of RBs contained in a downlink slot is dependent upon a downlink transmission bandwidth established in a cell. The resource grid of FIG. 3 can also be applied to uplink.

Figure 4:
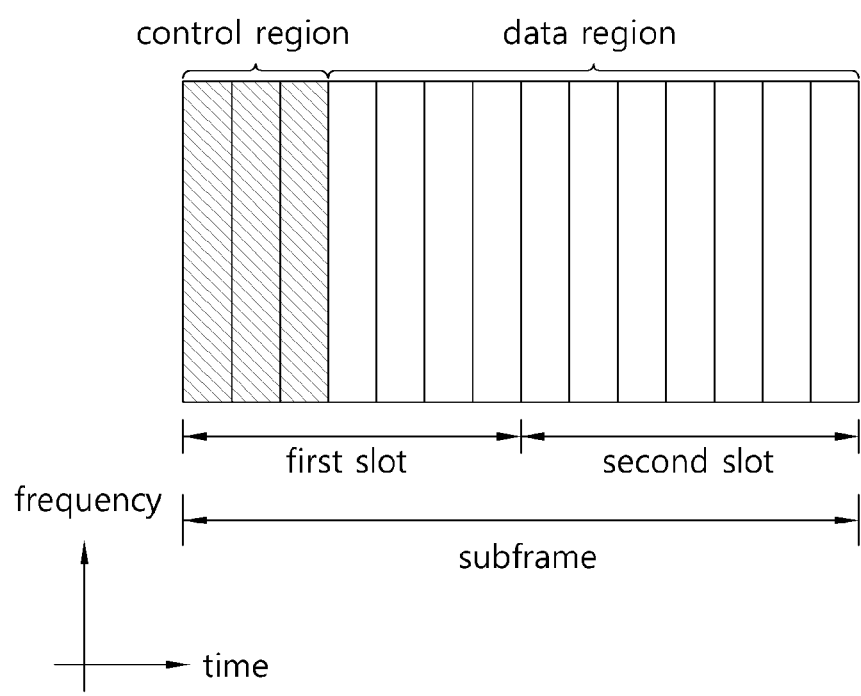
FIG. 4 exemplarily shows a downlink (DL) subframe structure.

FIG. 4 exemplarily shows a downlink (DL) subframe structure.

Referring to FIG. 4, a subframe includes two consecutive slots. The first three OFDM symbols located in the front of a first slot in a subframe are used as a control region to which a PDCCH is allocated, and the remaining OFDM symbols are used as a data region to which a Physical Downlink Shared Channel (PDSCH) is allocated. In addition to PDCCH, PCFICH, PHICH, and the like may be allocated to the control region. The UE decodes control information that is transmitted over a PDCCH, and reads data that is transmitted over a PDSCH. In this case, the control region may exemplarily include 3 OFDM symbols, and the control region may also exemplarily include two OFDM symbols or one OFDM symbol. The number of OFDM symbols used as a control region in a subframe may be identified through PCFICH.

The control region may include logical control channel element (CCE) sequences comprising a plurality of CCEs. The CCE sequence is an aggregate of all CCEs that construct the control region in a single subframe. CCE may correspond to a plurality of resource element groups (REGs). CCE may be mapped to 9 resource element groups (REGs). REG may be used to define mapping a control channel to a resource element. For example, one REG may include 4 REs.

A plurality of PDCCHs may be transmitted in a control region. PDCCH may carry control information such as scheduling allocation. PDCCH may be transmitted over an aggregation of one or some consecutive CCEs. PDCCH format and the number of available bits of a PDCCH are determined according to the number of CCEs constructing a CCE aggregation. The number of CCEs used for PDCCH transmission may also be referred to as a CCE aggregation level. In addition, the CCE aggregation level may be a CCE unit for searching for a PDCCH. The size of the CCE aggregation level is defined as the number of contiguous CCEs. For example, the CCE aggregation level may be an element of {1, 2, 4, 8}.

Control information transmitted over a PDCCH is called downlink control information (DCI). The DCI may include uplink scheduling information, downlink scheduling information, system information, uplink power control command, control information for paging, and control information for indicating a RACH response.

There are a variety of DCI formats, for example, format 0 for scheduling a physical uplink shared channel (PUSCH), format 1 for scheduling one PDSCH codeword, format 1A for compact scheduling of one PDSCH codeword, format 1B for compact scheduling of Rank-1 transmission of a single codeword in a spatial multiplexing mode, format 1C for very compact scheduling of a downlink shared channel (DL-SCH), format 1D for scheduling a PDSCH in a multi-user spatial multiplexing mode, format 2 for scheduling a PDSCH in a closed-loop spatial multiplexing mode, format 2A for scheduling a PDSCH in an open-loop spatial multiplexing mode, format 3 for transmitting a transmission power control (TPC) command of 2-bits power control for PUCCH and PUSCH, and format 3A for transmitting a TPC command of 1-bit power control for PUCCH and PUSCH.

Figure 5:
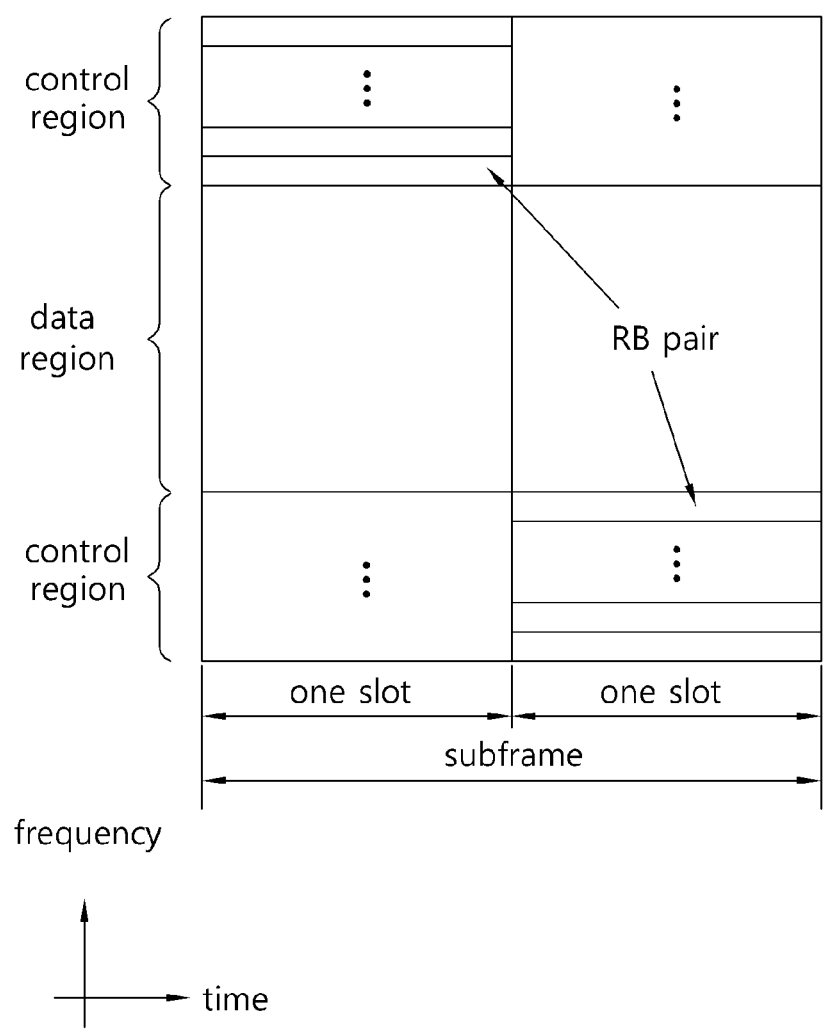
FIG. 5 exemplarily shows an uplink (UL) subframe structure.

FIG. 5 exemplarily shows an uplink (UL) subframe structure.

Referring to FIG. 5, the UL subframe can be divided into a control region and a data region in a frequency domain. A PUCCH carrying UL control information is allocated to the control region, and a PUSCH carrying user data is allocated to the data region.

PUCCH for one UE is allocated to a pair of RBs 51 and 52 in a subframe, and RBs 51 and 52 belonging to the RB pair occupy different subcarriers in each of two slots. Thus, the RB pair allocated to the PUCCH is "frequency-hopped" at a slot boundary.

PUCCH can support multiple formats. That is, PUCCH can transmit uplink control information having different numbers of bits per subframe according to the modulation scheme. For example, in case of using binary phase shift keying (BPSK) (PUCCH format 1a), UL control information of one bit can be transmitted over a PUCCH. In case of using quadrature phase shift keying (QPSK) (PUCCH format 1b), UL control information of 2 bits can be transmitted over a PUCCH. There are a variety of PUCCH formats, for example, format 1, format 2, format 2a, format 2b, and the like. Regarding the above-mentioned formats, Section 5.4 of "Technical Specification Group Radio Access Network; Evolved Universal Terrestrial Radio Access (E-UTRA); Physical Channels and Modulation (Release 8)" may be referred to.

Figure 6:
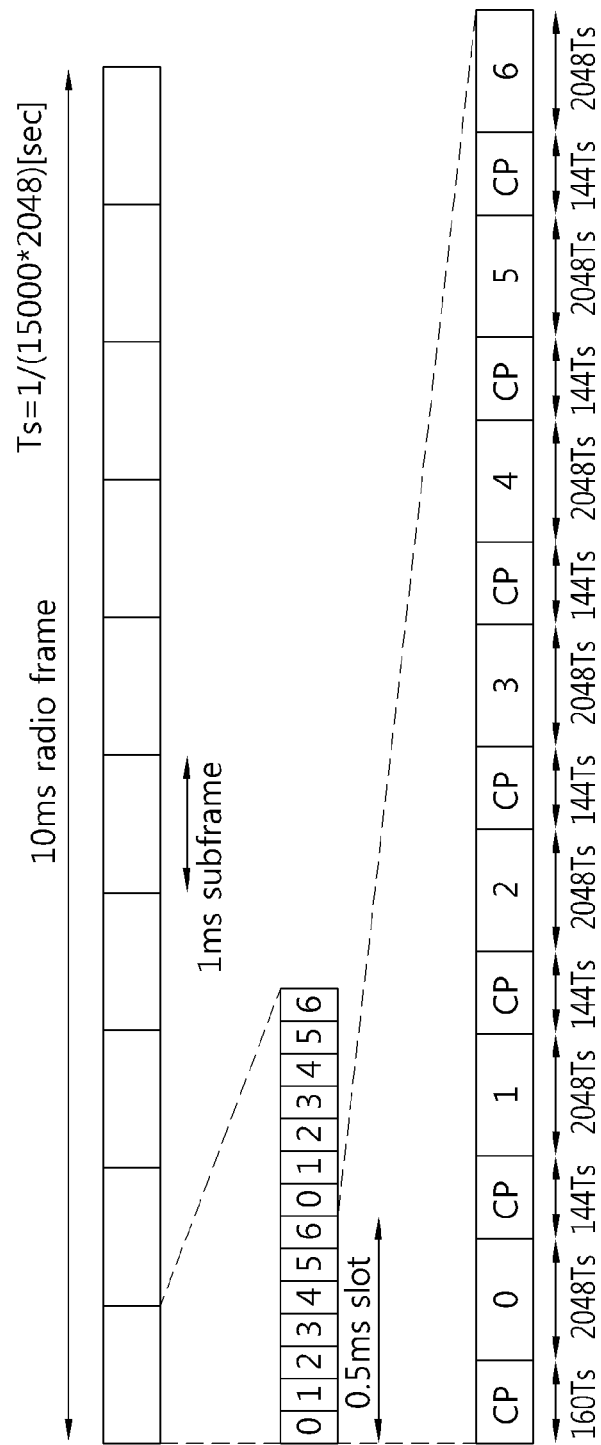
FIG. 6 is an example for inserting a cyclic prefix (CP) into an OFDM symbol.

FIG. 6 is an example for inserting a cyclic prefix (CP) into an OFDM symbol.

Referring to FIG. 6, according to a normal CP, a time interval in which a normal CP is inserted may be 160 Ts in the first symbol of a subframe, or may be 144 Ts in the remaining symbols other than the first symbol of the subframe (Ts=1/(15000*2048) sec). The CP is formed by copying and adding the last part of a symbol to the first part of the symbol. The CP can prevent the occurrence of inter-symbol interference.

Figure 7:
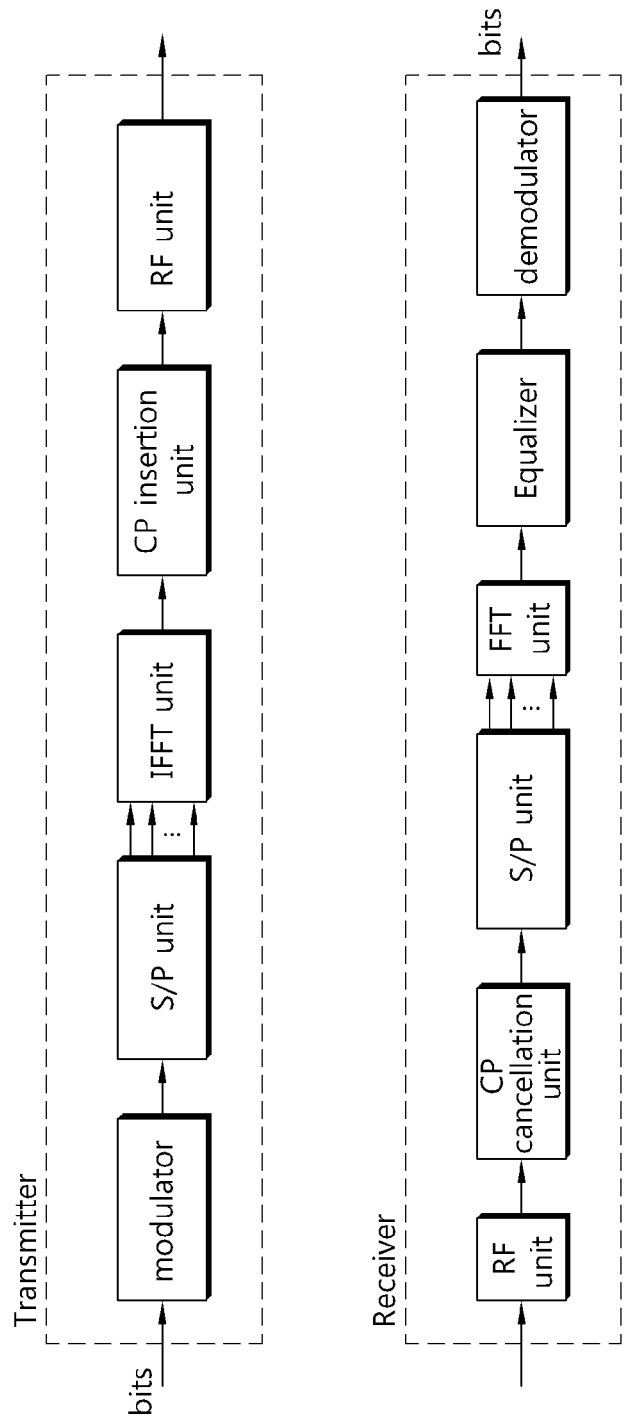
FIG. 7 is a block diagram illustrating structures of an OFDM transmitter and an OFDM receiver.

FIG. 7 is a block diagram illustrating structures of an OFDM transmitter and an OFDM receiver.

Referring to FIG. 7, the OFDM transmitter modulates information bits to be transmitted using a modulator, and inputs the modulated result to a serial/parallel (S/P) unit for converting a serial signal into a parallel signal. The modulator may use a variety of modulation schemes, for example, quadrature phase shift keying (QPSK), m-QAM (quadrature amplitude modulation), etc. The parallel signal converted by the S/P unit has a period longer than a channel delay spread. The parallel signal is input to an Inverse Fast Fourier Transform (IFFT) unit for converting a frequency-domain signal into a time-domain signal, and is IFFT-processed by the IFFT unit. CP is inserted into the IFFT-processed result, and is then transmitted through the RF unit. The RF unit includes at least one antenna.

The OFDM receiver receives a radio frequency (RF) signal through the RF unit, the cyclic prefix (CP) remover removes a CP from the received RF signal, and the S/P unit converts a serial signal into a parallel signal. The converted parallel signal is FFT-processed through the FFT unit. The FFT unit converts a time-domain signal into a frequency-domain signal. The frequency-domain signal is recovered to data after passing through an equalizer and a demodulator. The equalizer multiplies each subcarrier by the estimated channel response, such that it removes the influence of a channel from each subcarrier. The demodulator demodulates and recovers data using the demodulation scheme corresponding to the modulation scheme used in the modulator.

The OFDM transmitter may be a part of BS or RN. The OFDM receiver may be a part of RN or BS.

If the wireless communication system includes the RN, it is assumed that the RN has difficulty in simultaneously receiving/transmitting a signal through the same frequency band. Therefore, the RN transmits or receives signals of the same frequency band at different times. For example, the RN may receive signals from the BS at the subframe #n and transmit signals to the RN UE (also called a relay UE) at the subframe #n+1.

If the RN transmits and receives signals of the same frequency band, or if the RN receives and transmits signals of the same frequency band, a guard time is needed between the transmission time interval and the reception time interval of signals during the Tx/Rx switching of signals. The guard time is needed to stabilize and protect the system, or is also needed to generate a signal satisfying requirements of the system. For example, the guard time may include a transient time for stabilizing the operations of a power amplifier that amplifies signals.

Figure 8:
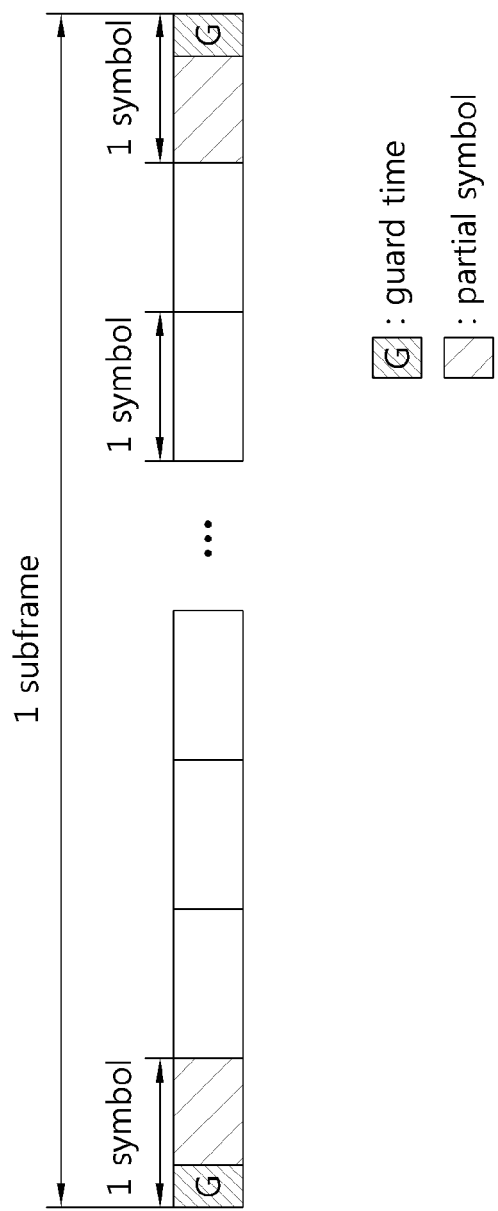
FIGS. 8 and 9 show examples in which guard times are present in a subframe.
Figure 9:
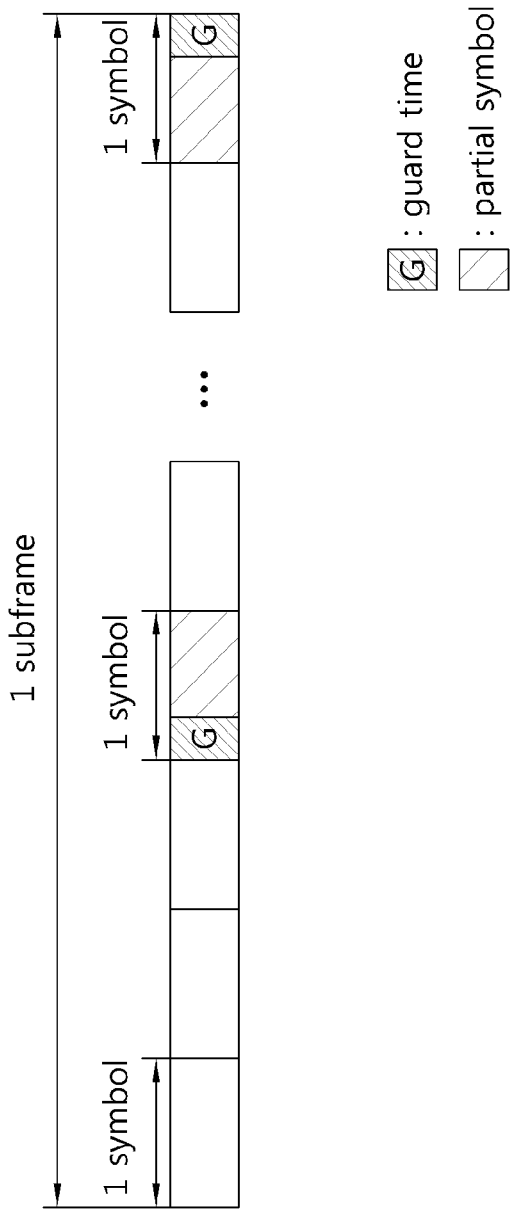

FIGS. 8 and 9 show examples in which a guard time is present in a subframe.

Referring to FIG. 8, two guard times are respectively located at boundaries of each subframe. That is, each of the first and last symbols of the subframe includes a guard time. The guard time may also be located at the remaining symbols other than symbols located at the boundaries of the subframe. Referring to FIG. 9, one of the two guard times is located at the center symbol of the subframe. That is, one guard time is located in the remaining symbols other than symbols located at the boundaries of the subframe. Although the above-mentioned examples show the location of guard time in case of the subframe serving as the scheduling unit, the scope or spirit of the present invention is not limited thereto. In other words, if the scheduling unit is a slot, the guard time may be located at either the center symbol of each slot or the boundaries of each slot. It should be noted that the above-mentioned guard time location is equally applied to the following description. This guard time may be a time interval less than one symbol. The remaining portion of one symbol except for guard time may be referred to as partial symbol.

Figure 10:
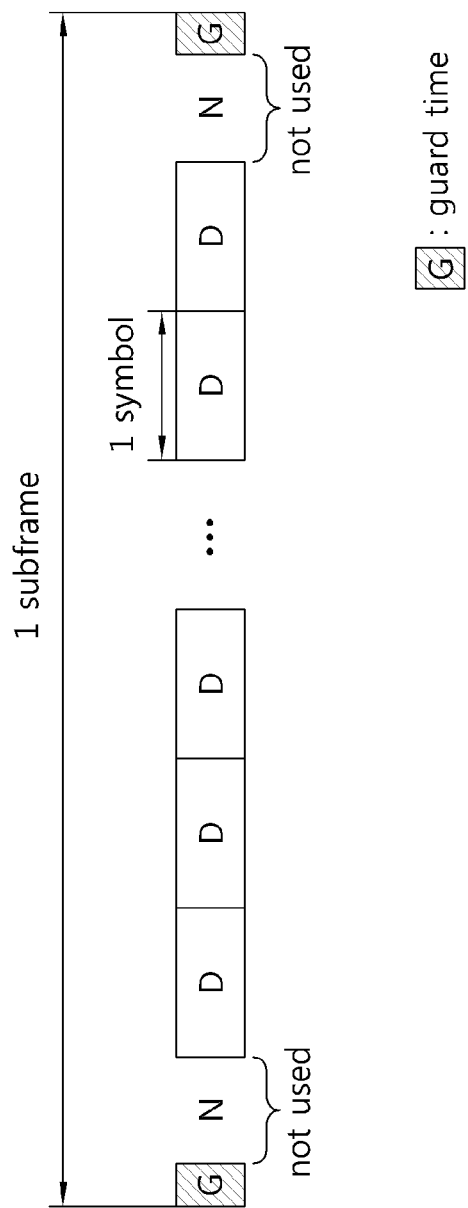
FIG. 10 is a conceptual diagram illustrating a conventional method for transmitting data in a subframe including a guard time.

FIG. 10 is a conceptual diagram illustrating a conventional method for transmitting data in a subframe including a guard time.

It is difficult to transmit data in the guard time. As can be seen from FIG. 10, if the guard time is located in the symbol located at a boundary of the subframe, the partial symbol other than the guard time of the corresponding symbol is not used for data transmission such that the corresponding symbol is wasted. For example, according to the LTE system, in case of the normal CP, the subframe includes 14 symbols. In case of the extended CP, the subframe includes 12 symbols. Two symbols are not used due to the guard time. If scheduling is performed in units of a slot, it may be impossible to use two symbols of one slot because of the guard time, and four symbols of one subframe may not be used because of the guard time. Therefore, a method for utilizing a symbol including a guard time and applying the resultant symbol to signal transmission is needed.

Figure 11:
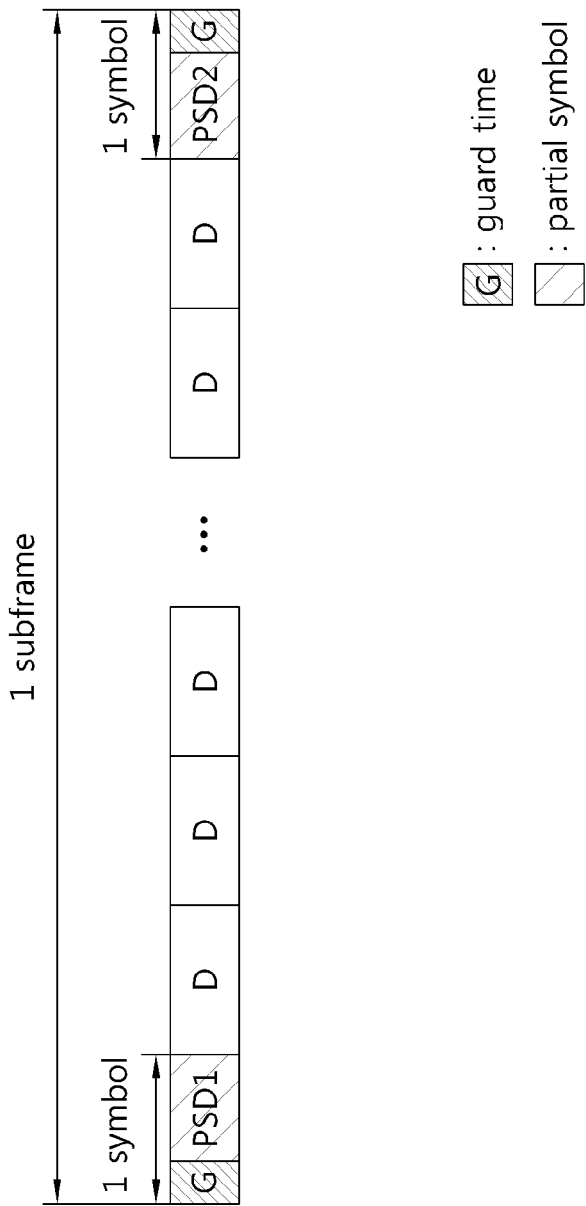
FIG. 11 is a conceptual diagram illustrating one example for transmitting different data pieces in two symbols each including a guard time.

FIG. 11 is a conceptual diagram illustrating one example for transmitting different data pieces in two symbols each including a guard time.

Referring to FIG. 11, different data pieces are loaded on the entirety of two partial symbols so that the resultant data pieces can be transmitted through the two partial symbols (as mentioned above, the time interval other than a guard time in a symbol including guard time may be referred to as a partial symbol).

Provided that data loaded on the first partial symbol is denoted by PSD1 and data loaded on the second partial symbol is denoted by PSD2, PSD1 and PSD2 may be different from each other. Provided that the guard time is very short relative to the symbol interval in such a manner that the short guard time can be ignored, PSD1 and PSD2 can be properly demodulated.

In order to satisfy the error rate required by the system, it may be necessary to perform stronger channel coding for PSD1 and PSD2 as compared to other symbols. For this purpose, a new resource allocation rule for performing channel coding in units of a symbol and transmitting the channel coded result can be defined. Alternatively, PSD1 and PSD2 may be repeated in the channel coding process such that the additional coding gain can be obtained. More coding is added to PSD1 and PSD2, resulting in reduction of the error rate.

If different data pieces are transmitted in different partial symbols, different symbol indexes may be assigned to symbols including each partial symbol. In addition, the symbol including each partial symbol is compared with another symbol, and there may occur a difference between the channel coding and the resource allocation rule, such that the last symbol indexes of the last subframe can be sequentially assigned. For example, in case of the normal CP, the symbol index #0 is assigned to the second symbol of the subframe, and the symbol index #1 is assigned to the third symbol of the subframe in such a manner that symbol indexes are sequentially assigned to symbols up to the $13^{rd}$ symbol in ascending numerical order, and then the symbol index #12 may be assigned to the first symbol of the subframe and the symbol index #13 may be assigned to the last symbol of the subframe. According to the above-mentioned symbol indexing method, data transmission/reception is carried out from the symbol index #0 to the symbol index #11 in the same manner as in the conventional method, and another data transmission/reception method can be applied to symbol indexes #12 and #13 of the subframe in a different way from the conventional method.

A method for repeatedly transmitting data through two symbols each including a guard time will hereinafter be described in detail.

Figure 12:
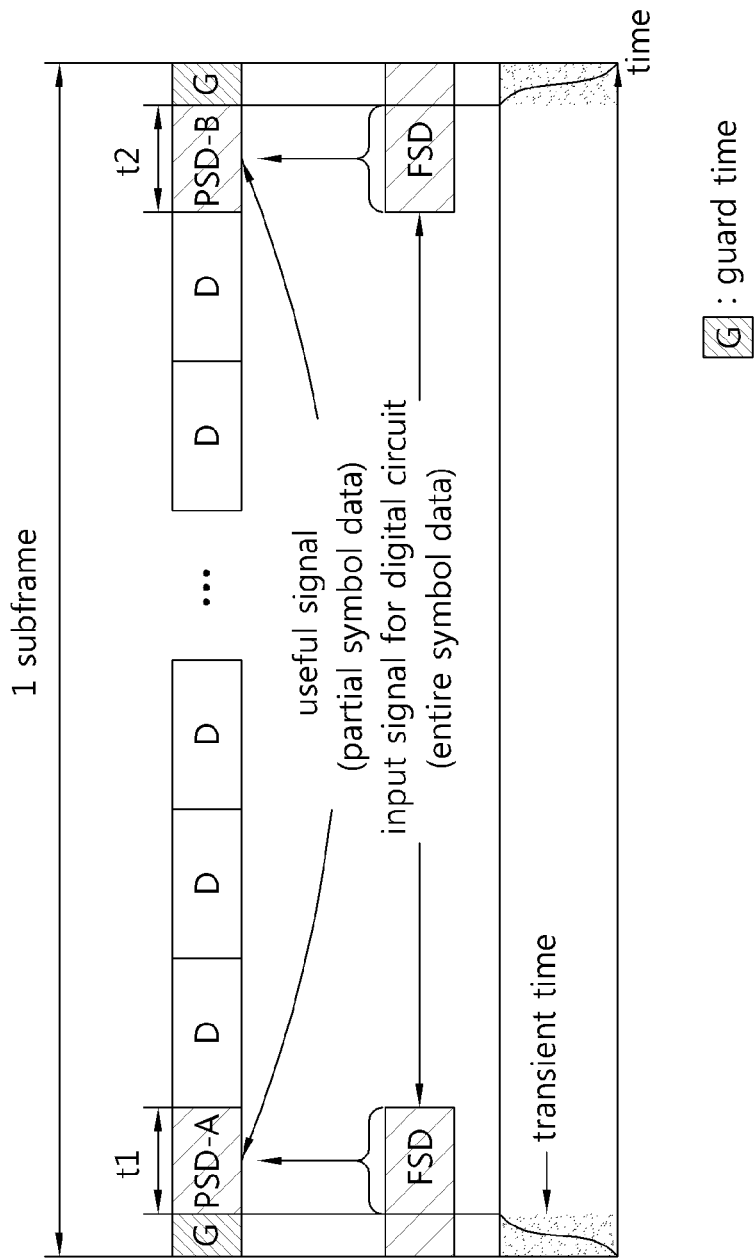
FIG. 12 is a conceptual diagram illustrating one example for repeatedly transmitting data in two symbols each including a guard time.

FIG. 12 is a conceptual diagram illustrating one example for repeatedly transmitting data in two symbols each including a guard time.

Referring to FIG. 12, the guard time may be contained in the first or last symbol of the subframe. For convenience of description, data transmitted through a partial symbol of the first symbol is denoted by Partial Symbol Data-A (PSD-A), and data transmitted through a partial symbol of the last symbol is denoted by PSD-B. One symbol data transmitted through one symbol is denoted by Full Symbol Data (FSD). PSD-A and PSD-B is one part of one symbol data (FSD). For example, PSD-A may correspond to the rear part of FSD, and PSD-B may correspond to the front part of FSD. Generally, FSD is composed of CP and data, where the CP is formed by cyclically copying the rear part of the data. Therefore, PSD-A and PSD-B are identical to each other in the same manner as in some data of PSD-A and PSD-B cyclically copied. In this way, a specific symbol through which PSD-A or PSD-B is transmitted may be referred to as "cyclic-copied symbol". Repeatedly transmitting data through two symbols each including a guard time may be classified into the following first and second cases 1) and 2).

1) In the first case, data can be transmitted through the entire symbol including a partial symbol and a guard time. That is, in case of the symbol including the guard time located at the boundary of the subframe, the transmitter applies/amplifies/transmits signals through the entire symbol irrespective of the guard time. Since data is loaded and transmitted even in the guard time, data distortion may occur in the guard time. However, signals are transmitted through the same processing process as in the symbol having no guard time, such that such signal transmission can be easily implemented. For example, in case of the first symbol, the guard time is located in the front part of the symbol, such that data located at the front part of the symbol may be distorted. On the other hand, in case of the last symbol, since the guard time is located at the rear part of the last symbol, data located at the rear part of the symbol may be distorted.

2) In the second case, data can be transmitted only through the partial symbol of the symbol including the guard time. That is, data is not transmitted in the guard time of the symbol including the guard time, and data can be transmitted using all or some of the partial symbol. The second case will hereinafter be described with reference to FIG. 13.

Figure 13:
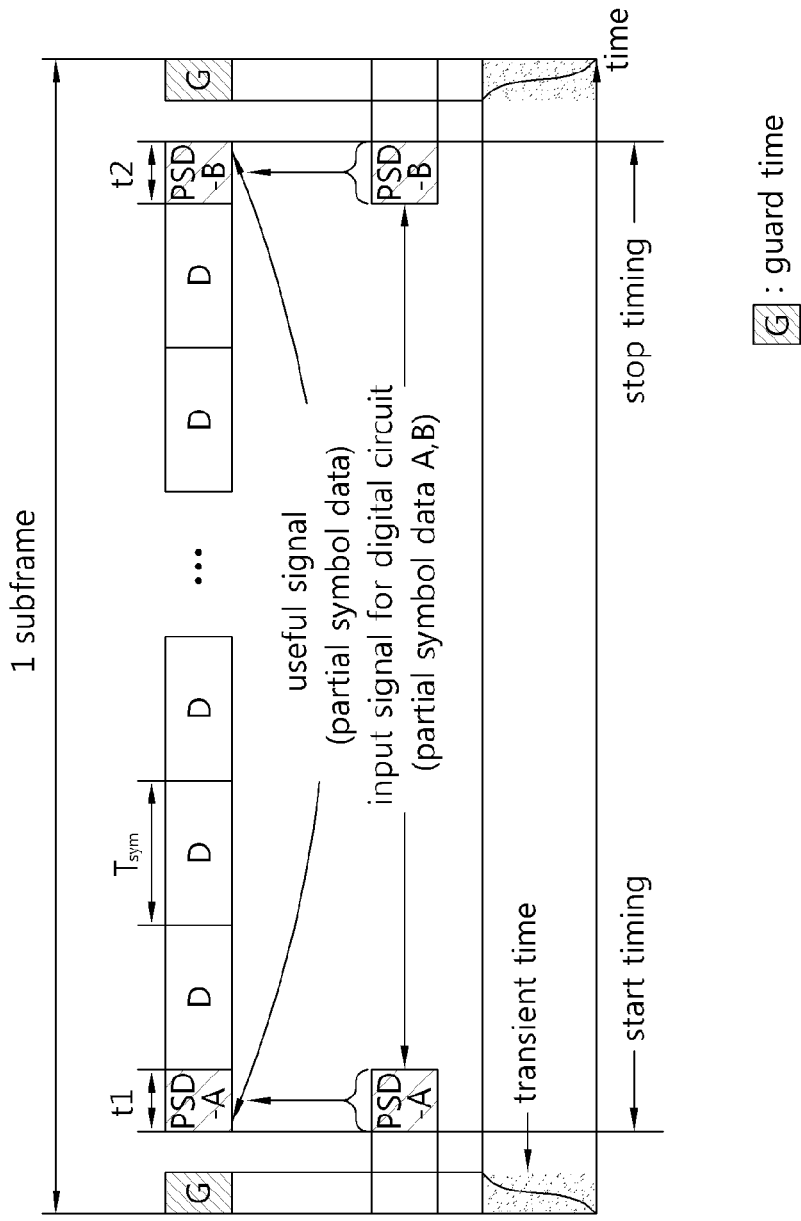
FIG. 13 is a conceptual diagram illustrating one example for repeatedly transmitting data only in partial symbols of two symbols each including a guard time.

FIG. 13 is a conceptual diagram illustrating one example for repeatedly transmitting data only in partial symbols of two symbols each including a guard time.

Referring to FIG. 13, data is transmitted only in the partial symbol of the symbol including the guard time. In this case, signals may be received from a specific time point of the partial symbol, or signals may be transmitted until reaching a specific time of the partial symbol. Since data is generated to be distorted in the guard time, such that carrying data in the guard time may be meaningless, data is transmitted from a specific time of the partial symbol causing no data distortion.

For example, data transmitted in the first symbol of the subframe is applied for a specific time interval 't1' of the partial symbol of the first symbol, such that the resultant data is generated. Data transmitted in the last symbol is generated for a specific time interval 't2' of the last symbol. In FIG. 13, PSD-A may include the rear part of single symbol data, and PSD-B may include the front part of the single symbol data. Although PSD-A and PSD-B are generated from the same one symbol data, PSD-A and PSD-B correspond to the rear part and the front part the one symbol data, respectively, such that PSD-A and PSD-B may have different contents.

't1' and 't2' may be established in various ways according to the demodulation schemes of the OFDM receiver. For example, if one symbol interval is denoted by $T_{sym}$, t1 may be identical to t2, and each of t1 and t2 may be established by $(½)*T_{sym}$ (i.e., $t1=t2=½)*T_{sym}$). Alternatively, $t1 \geq (½)T_{sym}$ and $t2 \geq (½)T_{sym}$ may be achieved. In order to recover a correct signal in the demodulation process of the OFDM receiver, t1 or t2 may be established by "$(½)*T_{sym}+CP$ length" in consideration of the CP of each symbol.

Figure 14:
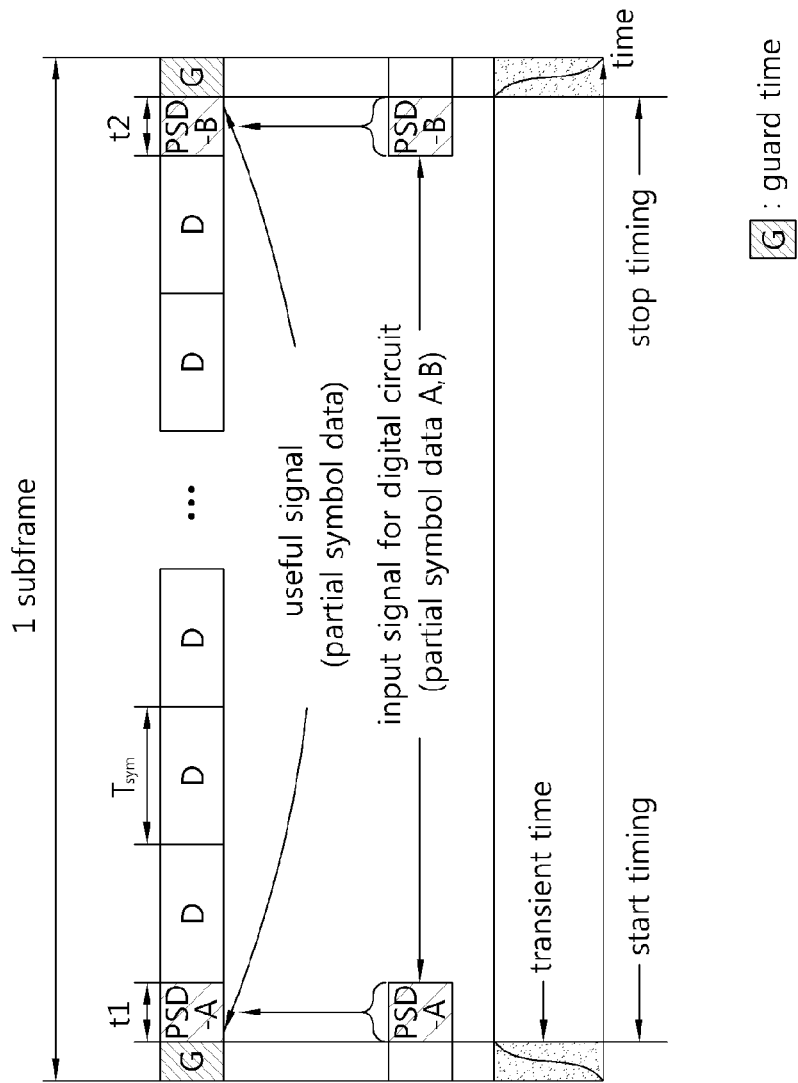
FIG. 14 is a conceptual diagram illustrating another example for repeatedly transmitting data in partial symbols of two symbols each including a guard time.

FIG. 14 is a conceptual diagram illustrating another example for repeatedly transmitting data in partial symbols of two symbols each including a guard time.

Referring to FIG. 14, t1 or t2 may be defined as a specific time interval obtained by excluding the guard time from $T_{sym}$. In this case, the OFDM transmitter allocates data to the entirety of the partial symbol and transmits the resultant data, and the OFDM receiver may selectively couple a necessary part.

Provided that one symbol data can be recovered, t1 and t2 may be established independent of each other.

Figure 15:
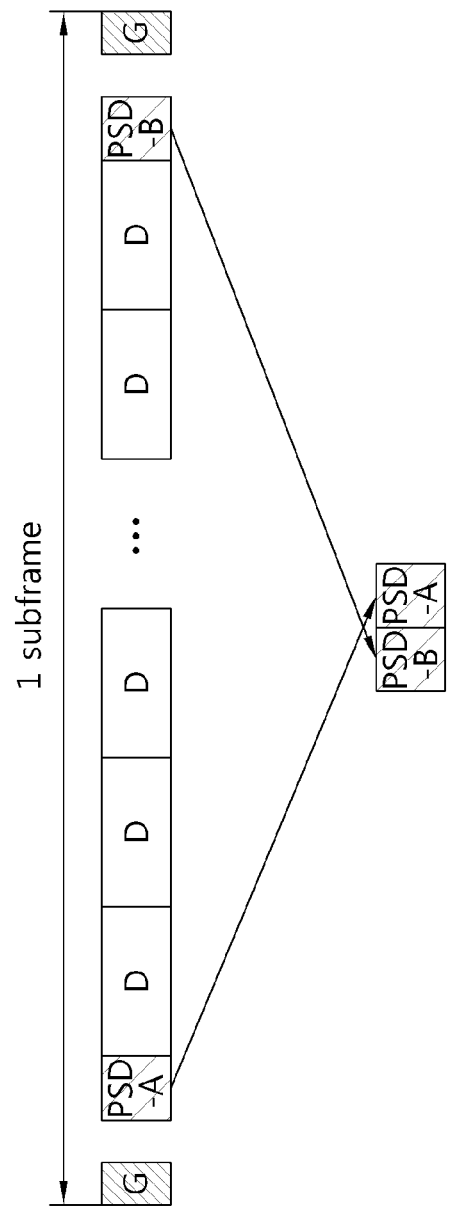
FIG. 15 is a conceptual diagram illustrating an example for coupling data of partial symbols in a demodulation process of an OFDM receiver.

FIG. 15 is a conceptual diagram illustrating an example for coupling data of partial symbols in a demodulation process of an OFDM receiver.

In the demodulation process of the OFDM receiver, one symbol data can be recovered in such a manner that data is coupled in the order of PSD-B and PSD-A. In this case, coupling between PSD-B and PSD-A may be performed in the previous stage of the FFT unit. In other words, instead of demodulating data through the FFT process and then coupling the partial symbol, one symbol can be recovered in such a manner that the received RF signal is first coupled and FFT-processed.

A method for assigning symbol indexes, in a subframe including a guard time will hereinafter be described in detail.

Figure 16:
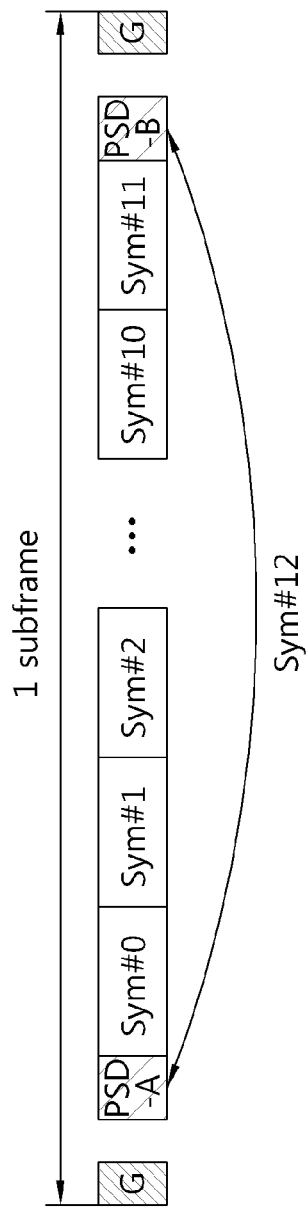
FIG. 16 is a conceptual diagram illustrating an example for assigning symbol indexes in a subframe including a guard time.

FIG. 16 is a conceptual diagram illustrating an example for assigning symbol indexes in a subframe including a guard time.

In case of a normal CP for use in LTE, the first symbol index of the subframe is set to 0, the second symbol index is set to 1, . . . and the last symbol index is set to 13. However, the first symbol or the last symbol including the guard time may not transmit data or may transmit data as necessary. In other words, the first or last symbol may be punctured and may transmit no data in the same manner as in the conventional art, or may transmit data according to the present invention. The symbol including a guard time can be utilized for special purposes, such that the first symbol index is not set to zero and the last available symbol index can be assigned to the first symbol.

For example, in case of a normal CP, the symbol index #0 is assigned to the second symbol of the subframe, the symbol index #1 is assigned to the third symbol, and the symbol indexes are sequentially assigned to symbols up to the $13^{rd}$ symbol in ascending numerical order. The partial symbol of the first symbol is coupled to the partial symbol of the last symbol so as to make a single symbol, and then the last symbol index #12 can be assigned to the single symbol.

The symbol indexing method can allow performing interleaving, puncturing, and mapping according to the symbol index without any change, such as in LTE. The signal transmission method according to the present invention can be applied only to a symbol including the last symbol index. Provided that the signal transmission method of the present invention is not applied, it is impossible for a relay node (RN) of a backhaul link to use two symbols each including the guard time, in which case the two impossible symbols are punctured and data can be transmitted. In case of the normal CP, the RN punctures two symbols each including the guard time, and data can be transmitted using 12 symbols. In case of using 14 symbols irrespective of the guard time contained in the subframe, the RN may transmit data without puncturing the symbol.

A method for transmitting data using a short block (SB) in a symbol including a guard time will hereinafter be described in detail. The method for transmitting data using the short block (SB) is conceptually identical to the method for transmitting data using the shortened symbol in a time domain. In this case, the short symbol means a symbol having a shorter interval in a time domain as compared to the general symbol (See FIG. 3). In addition, a method for transmitting data using a long block (LB) is conceptually identical to a method for transmitting data using a general symbol.

FIG. 17 is a conceptual diagram illustrating comparison of a short block (SB) and a long block (LB) and a method for generating a short block.

Referring to FIG. 17, SB indicates radio resources. In more detail, a time interval of the SB is shorter than that of the LB in the time domain, and subcarrier spacing of the SB is wider in the frequency domain. For example, the subcarrier spacing of the SB may be 30 KHz. LB corresponds to the entirety of one symbol in a time domain, and the subcarrier spacing of the LB may be narrower than that of SB. For example, the subcarrier spacing of LB may be 15 KHz.

For example, the SB may be composed of a half of a time interval of LB. In other words, provided that a time interval of the LB is denoted by T, a time interval of the SB may be denoted by T/2. When comparing the subcarrier spacing of the LB with the subcarrier spacing of the SB in the frequency domain, the LB may have the subcarrier spacing of 15 KHz and the SB may have the subcarrier spacing of 30 KHz. The number of bits capable of being transmitted through the SB may be a half of the number of bits of the LB. If LB is generated through N-point IFFT, SB may be generated through N/2-point IFFT. Although SB is generally composed of a half of the time interval of LB, the scope or spirit of the present invention is not limited thereto. SB may also be composed of a ⅔ time interval (and correspond to 8 subcarriers in the frequency domain) of the LB according to the guard time contained in the symbol.

Figure 18:
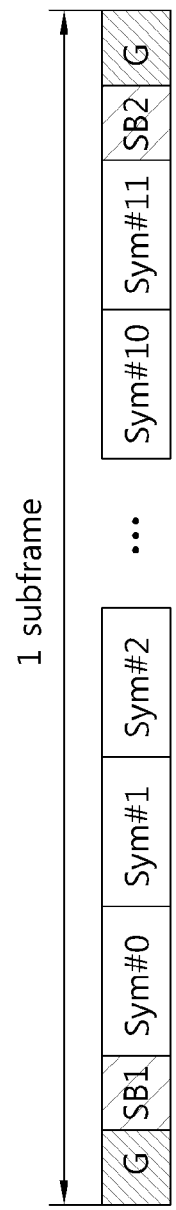
FIG. 18 is a conceptual diagram illustrating one example for assigning a short block to a symbol including a guard time.

FIG. 18 is a conceptual diagram illustrating one example for assigning a short block (SB) to a symbol including a guard time.

Referring to FIG. 18, short blocks (SB1, SB2) may be assigned to the partial symbols of the first or last symbol. Data capable of being transmitted in the system including no guard time is cut in half, one half is transmitted through SB1 and the other one is transmitted through SB2. If the OFDM receiver receives (SB1+SB2) and couples the received SB1 and SB2, the OFDM receiver receives data transmitted through one symbol as a result. Therefore, the number of symbols wasted by the guard time can be reduced by one.

Even in the case of using the SB, the last symbol index of the subframe may be assigned to a symbol composed of SB1 and SB2 (SB1+SB2). Index '0' is not assigned to the first symbol of the subframe, and Index '0' is assigned to the second symbol of the subframe. Symbol indexes are sequentially assigned to the symbols starting from the third symbol in ascending numerical order. SB1 contained in the first symbol of the subframe is coupled to SB2 contained in the last symbol of the subframe so that one symbol is formed and the symbol index '12' is assigned to the resultant symbol.

Figure 19:
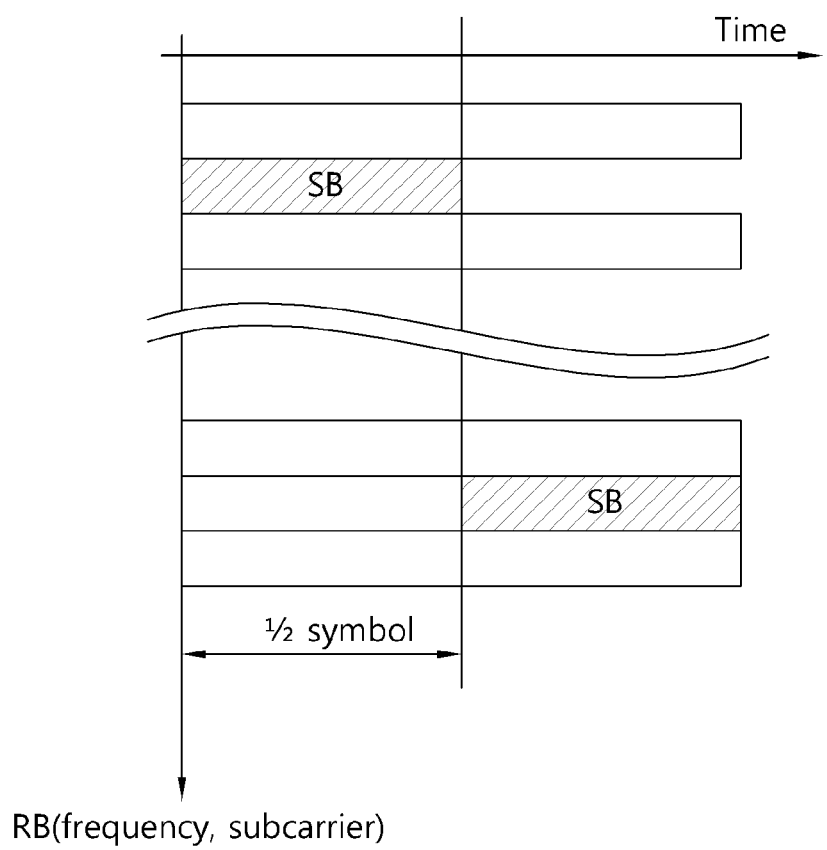
FIG. 19 exemplarily shows the locations of radio resources to which a short block is capable of being assigned.

FIG. 19 exemplarily shows the locations of radio resources to which a short block (SB) is capable of being assigned.

SB may be assigned to a band preferable to signal transmission from among the frequency band. In addition, SB may be assigned to the first or second slot in the time domain. That is, SB is not limited to a specific slot of the subframe, and can be assigned to any slot without limitation.

Figure 20:
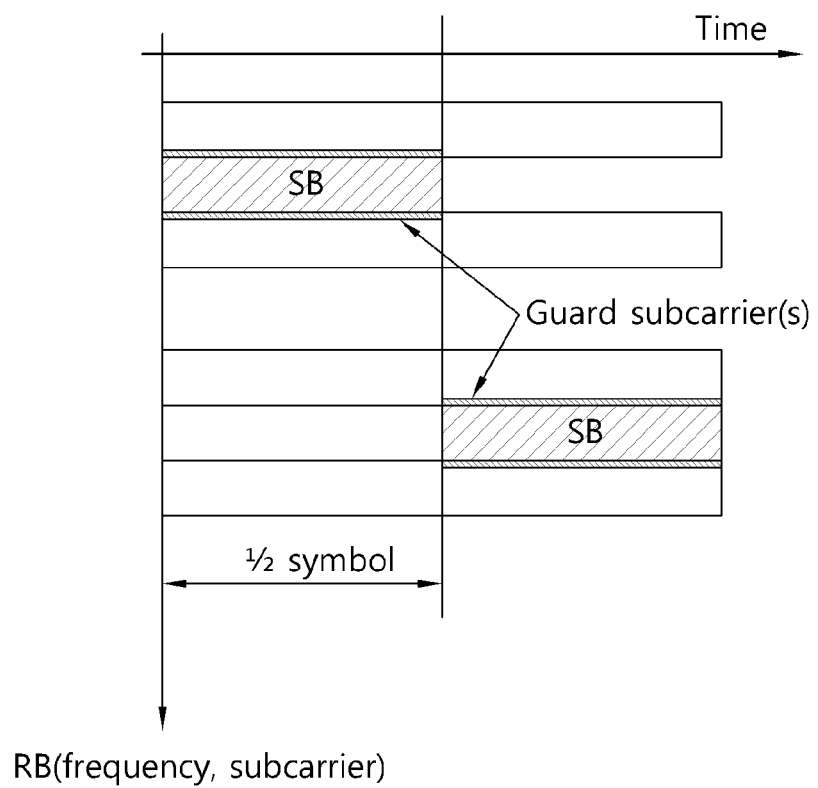
FIGS. 20 and 21 are conceptual diagrams illustrating examples for establishing a guard subcarrier to resource blocks adjacent to a short block.
Figure 21:
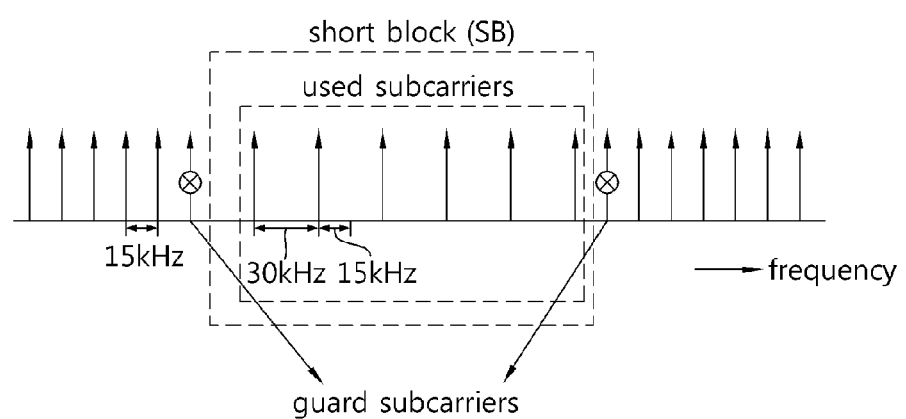

FIGS. 20 and 21 are conceptual diagrams illustrating examples for establishing a guard subcarrier to resource blocks adjacent to a short block (SB).

Referring to FIG. 20, the guard subcarrier may be established to resource blocks adjacent to the SB in the frequency domain. The subcarrier spacing for use in the SB is two times the subcarrier spacing of the LB, and is 30 KHz. Therefore, the number of subcarriers capable of being used in SB is a half of the number of subcarriers capable of being used in LB. For example, if the number of subcarriers of the LB is set to 12, the number of subcarriers of the SB is set to 6. Signals are not assigned to subcarriers of LB adjacent to SB, such that the resultant signals are not used as guard subcarriers. In this case, as can be seen from FIG. 21, all the 6 subcarriers contained in SB can be used.

FIGS. 22 to 26 are conceptual diagrams illustrating examples for establishing a guard subcarrier in a short block (SB).

Figure 22:
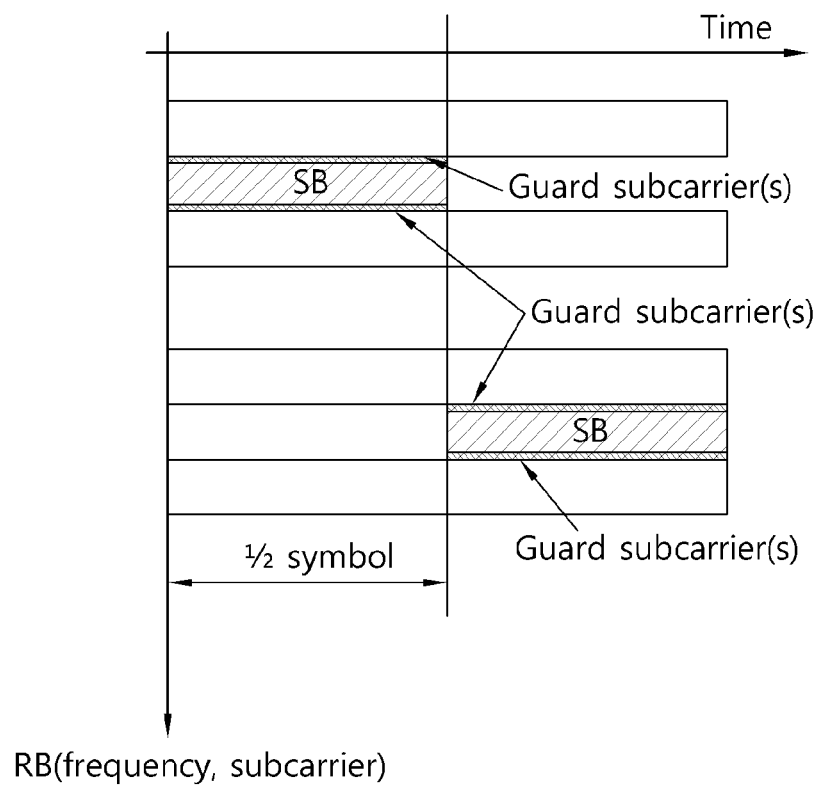
FIGS. 22 to 26 are conceptual diagrams illustrating examples for establishing a guard subcarrier in a short block.
Figure 23:
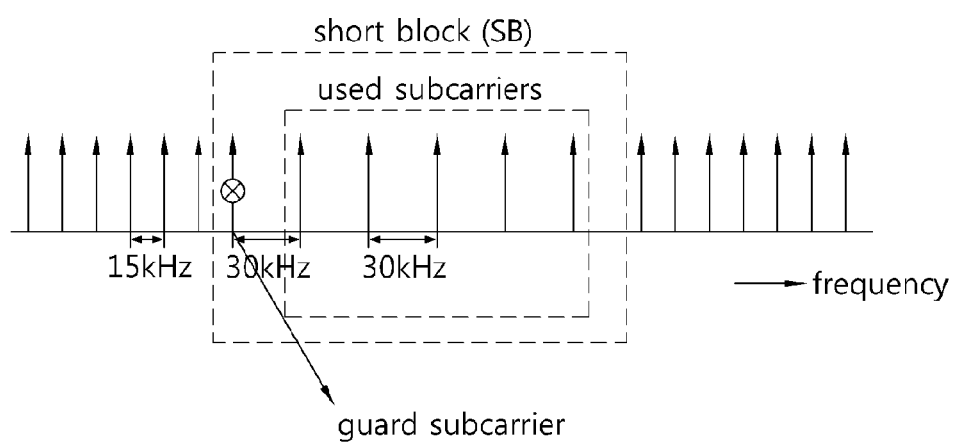
Figure 24:
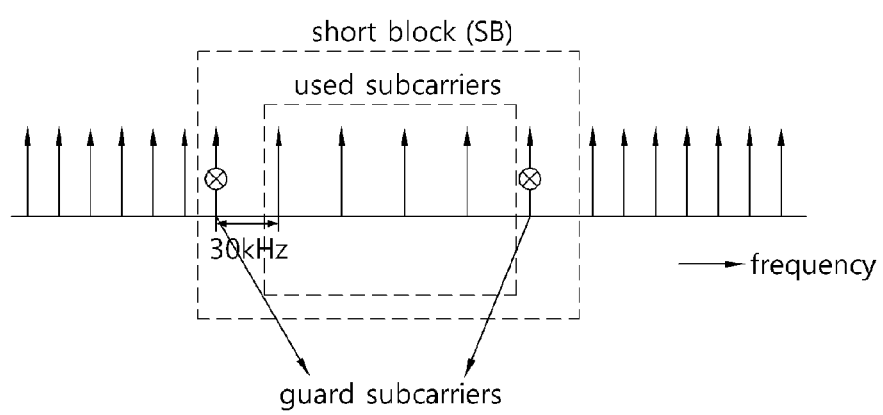
Figure 25:
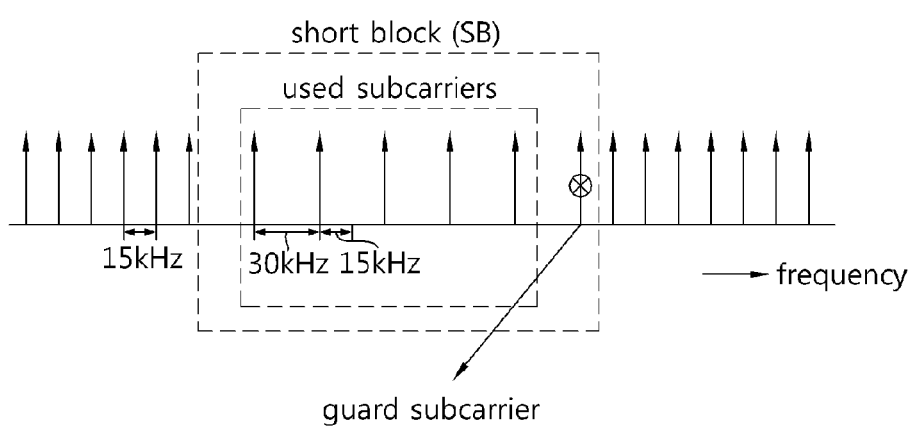
Figure 26:
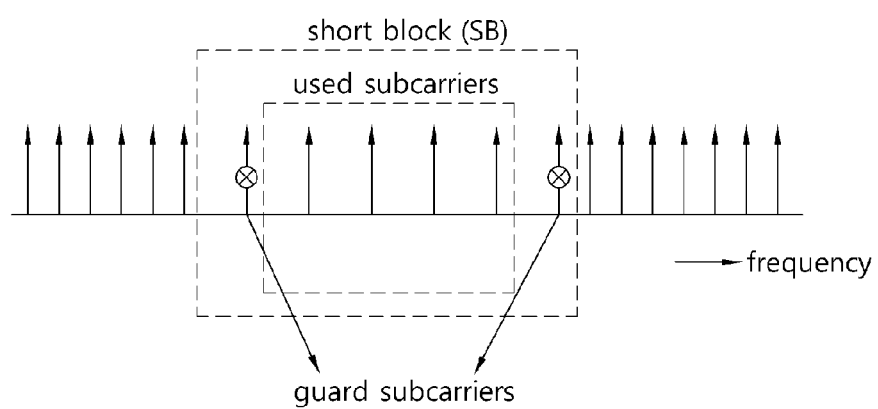

Although FIGS. 22 to 24 exemplarily show guard subcarriers that are established at both boundaries of the frequency domain of the SB, the scope or spirit of the present invention is not limited thereto. That is, the guard subcarriers may be established only in one boundary as shown in FIG. 23 or 25. If the guard subcarriers are established in both boundaries of the frequency domain, the number of subcarriers capable of being used in SB is reduced to 4, but it is advantageous in that interference affecting adjacent resource blocks can be greatly reduced. If the guard subcarrier is established only in one boundary, the number of subcarriers capable of being used in SB is increased to 5 such that the number of subcarriers is increased than that of the former case in which subcarriers are established at both boundaries of the subframe. Therefore, it is possible to determine how to establish guard subcarriers in consideration of a channel condition of the backhaul link (e.g., the amount of data or channel status of a backhaul link). Interference affecting adjacent resource blocks can be reduced by guard subcarriers established in SB. Differently from FIGS. 20 to 26, the guard subcarrier may be composed of multiple contiguous subcarriers.

Figure 27:
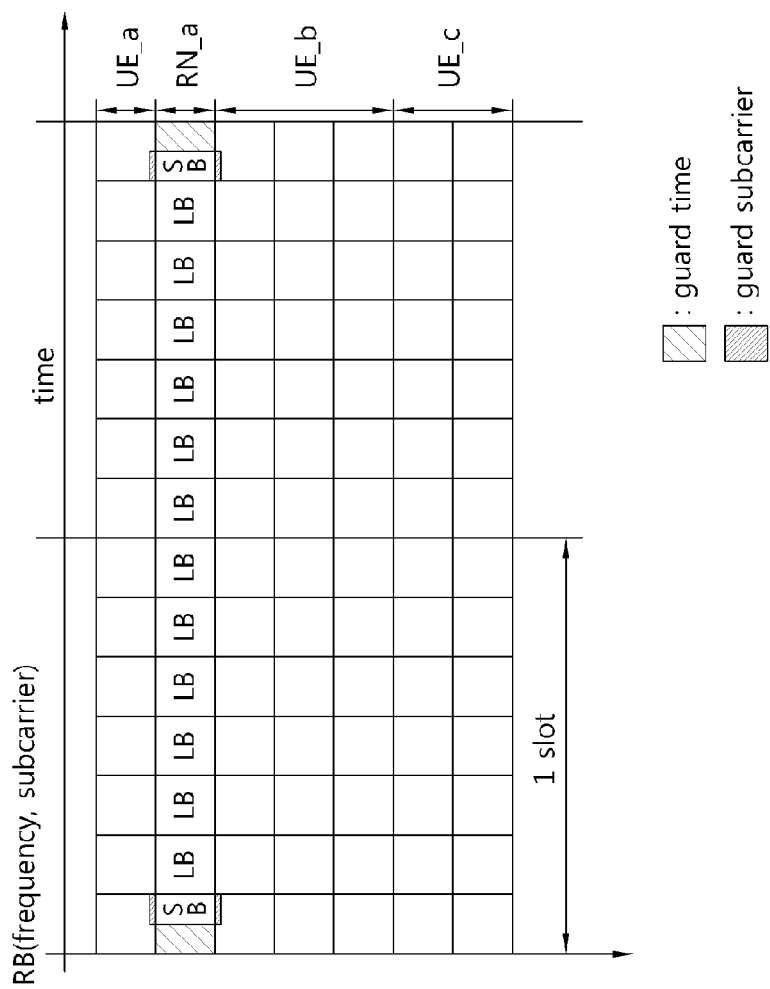
FIGS. 27 and 28 are conceptual diagrams illustrating examples for assigning not only a short block contained in a subframe but also guard subcarriers in a multi-user environment.
Figure 28:
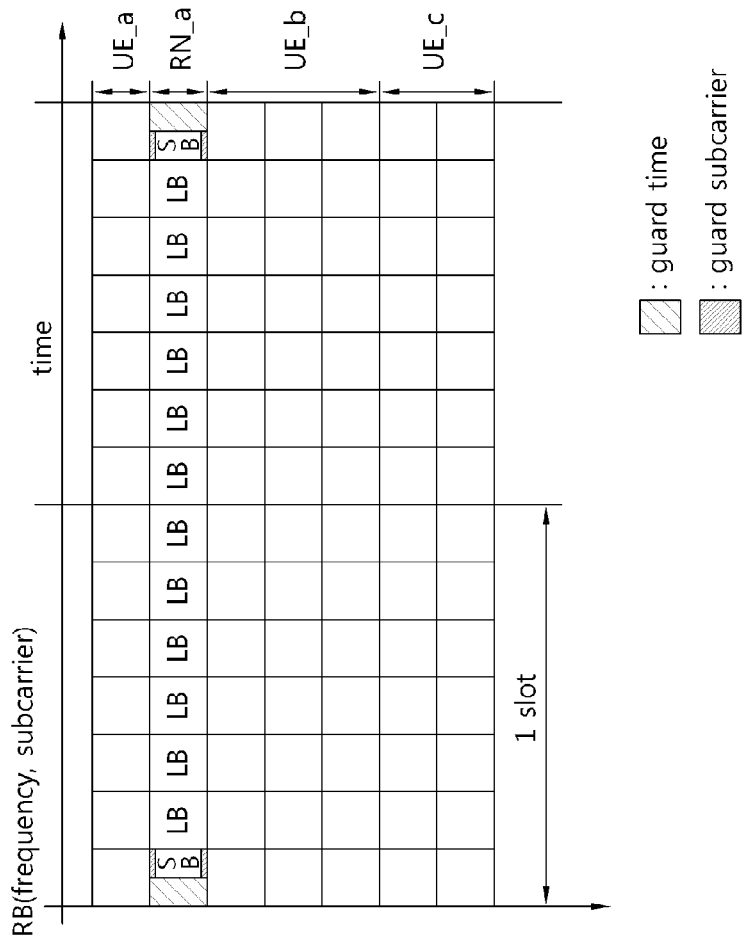

FIGS. 27 and 28 are conceptual diagrams illustrating examples for assigning not only a short block (SB) contained in a subframe but also guard subcarriers in a multi-user environment.

Referring to FIGS. 27 and 28, the partial symbol of a symbol including a guard time may be composed of SB in a frequency band assigned to RN. The remaining symbols other than the symbol including the guard time may be composed of LB. In FIG. 27, the guard subcarrier may be established in resource blocks adjacent to SB in the frequency domain. That is, the guard subcarriers are established in the frequency band assigned to UE_a or UE_b. In contrast, in FIG. 28, subcarriers located at a boundary of SB in the frequency domain are established as guard subcarriers.

Figure 29:
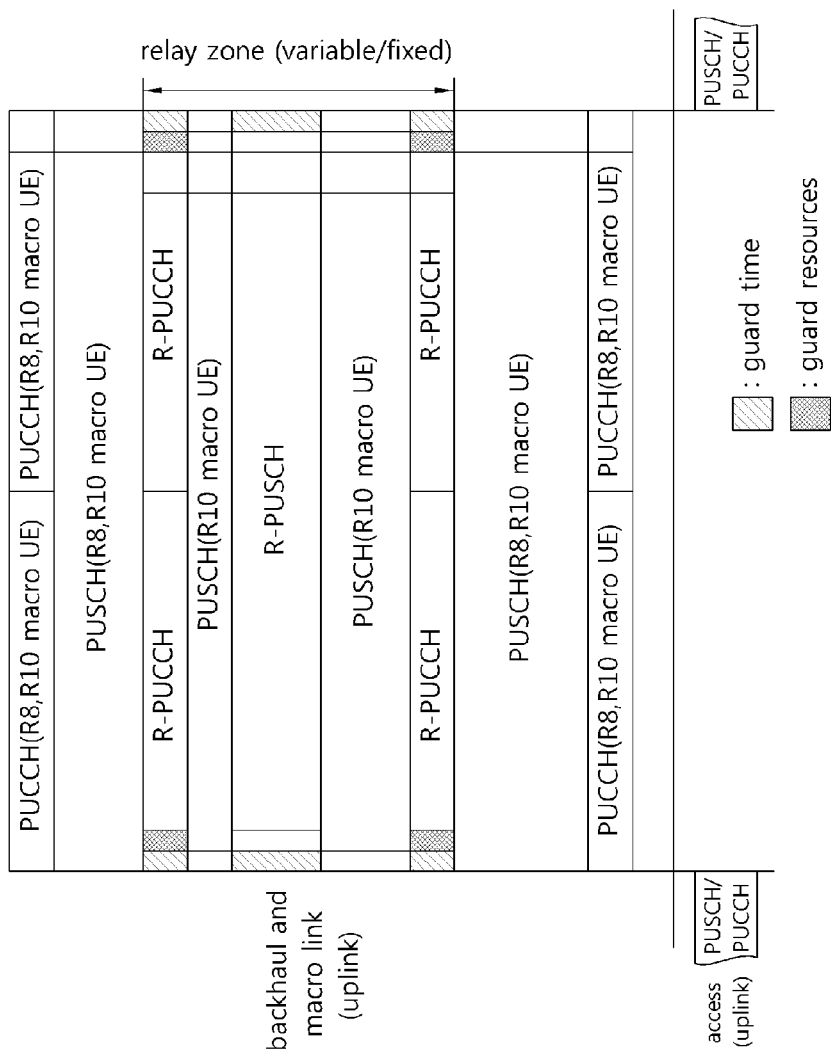
FIGS. 29 and 30 show exemplary subframe structures capable of being used in a backhaul uplink.
Figure 30:
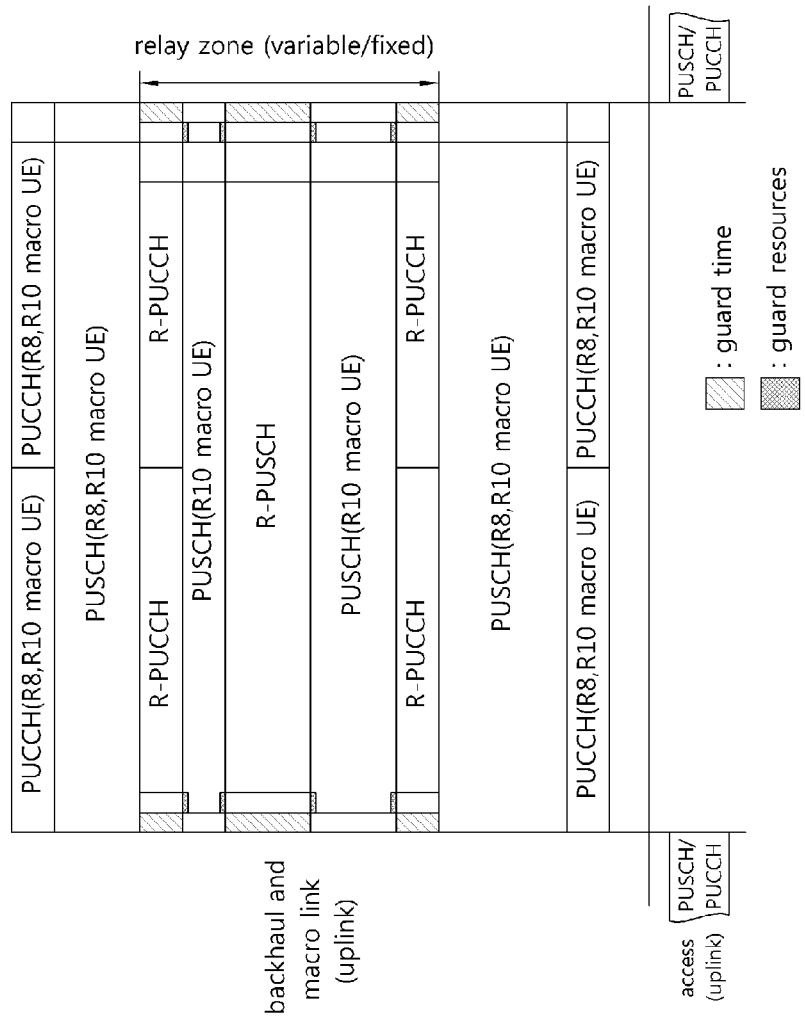

FIGS. 29 and 30 show exemplary subframe structures capable of being used in a backhaul uplink. In FIGS. 29 and 30, a region in which the RN transmits an uplink control signal to a base station (BS) is denoted by R-PUCCH, and a region in which the RN transmits data to the BS is denoted by R-PUSCH.

Referring to FIG. 29, if the guard time is contained in the first or last symbol in the R-PUCCH region, signals may not be transmitted to the partial symbol of the first or last symbol. The partial symbol of the symbol including the guard time may serve as a guard band that prevents interference of the frequency band or R-PUSCH band assigned to a macro UE. The partial symbol of the first or last symbol may be referred to as a guard resource. If the frequency band assigned to RN is large, the ratio of the guard resource is relatively very small, wasted resources are not significant. It is not necessary for the guard resource to be identical to the partial symbol, and the guard resource may be smaller or larger than the partial symbol.

Referring to FIG. 30, if the guard time is contained in each of the first and last symbols of the band assigned to RN, the partial symbol of each of the first and last symbols may be assigned to the macro UE. In this case, guard resources may be established in resource blocks adjacent to partial symbols of the first and last symbols. For example, the macro UE may not use at least one subcarrier adjacent to the partial symbols of the first and last symbols within the PUSCH band. That is, some portions (e.g., various resources from one subcarrier to multiple resource blocks) of radio resources assigned to the macro UE are not used to prevent the occurrence of interference.

Methods of FIGS. 29 and 30 may be coupled to each other and used. That is, the RN does not transmit signals in a partial symbol of the symbol including the guard time. The macro UE transmits signals in the partial symbol unused by the RN. If necessary, the macro UE may not transmit signals in some radio resources of the PUSCH region adjacent to the partial symbol. Although the above-mentioned description has exemplarily disclosed the uplink subframe, it should be noted that the present invention can also be applied to a downlink subframe.

Mathematical analysis of signals demodulated by the receiver according to the method (i.e., a method for utilizing the cyclically copied symbol) described with reference to FIGS. 12 to 15 (i.e., a method for repeatedly transmitting data in the partial symbol of the symbol including the guard time) will hereinafter be described.

It is assumed that a $k^{th}$ subcarrier signal of the first symbol is denoted by $A(k)$, and a $k^{th}$ subcarrier signal of the last symbol is denoted by $B(k)$. As a result, a time-domain signal of the first or last symbol can be represented by Equation 1.

$$a(n) = \sum_{k=0}^{N-1} A(k)e^{j2\pi kn/N}, \quad b(n) = \sum_{k=0}^{N-1} B(k)e^{j2\pi kn/N} \quad \text{[Equation 1]}$$

In Equation 1, N is the power of 2 indicating the FFT size. Provided that the time-domain signal formed by combination of the first symbol signal and the last symbol signal is denoted by $c(n)$, $c(n)$ is represented by the following equation 2.

$$c(n) = \begin{cases} a(n), & 0 \leq n < N/2 \\ b(n), & N/2 \leq n < N \end{cases} \quad \text{[Equation 2]}$$

Provided that the extracted $M^{th}$ subcarrier signal obtained after the receiver performs FFT of $c(n)$ is denoted by $C(M)$, $C(M)$ is represented by the following equation 3. In this case, since the $M^{th}$ subcarrier signal is cyclically copied, it is assumed that $A(M)=B(M)$.

$$C(M) = \frac{1}{N}\left[\sum_{n=0}^{N/2-1} a(n)e^{-j2\pi Mn/N} + \sum_{n=N/2}^{N-1} b(n)e^{-j2\pi Mn/N}\right] \quad \text{[Equation 3]}$$

$$= \frac{1}{N}\sum_{n=0}^{N/2-1}\left[\sum_{k=0}^{N-1} A(k)e^{j2\pi kn/N}e^{-j2\pi Mn/N}\right] +$$

$$\frac{1}{N}\sum_{n=N/2}^{N-1}\left[\sum_{k=0}^{N-1} B(k)e^{j2\pi kn/N}e^{-j2\pi Mn/N}\right]$$

$$= \frac{1}{N}\sum_{k=0}^{N-1}\left[\sum_{n=0}^{N/2-1} A(k)e^{j2\pi(k-M)n/N} + \sum_{n=N/2}^{N-1} B(k)e^{j2\pi(k-M)n/N}\right]$$

$$= \frac{1}{N}\sum_{k=0}^{N-1}\left[\sum_{n=0}^{N/2-1}\{A(k) + e^{j\pi(k-M)}B(k)\}e^{j2\pi(k-M)n/N}\right]$$

$$= A(M) + \sum_{k=0, k\neq M}^{N-1}[(A(k) + (-1)^{(k-M)}$$

$$B(k))\frac{1}{N}\sum_{n=0}^{N/2-1} e^{j2\pi(k-M)n/N}]$$

-continued $$= A(M) + \sum_{k=0, k\neq M}^{N-1}[(A(k) + (-1)^{(k-M)}B(k))f(k-M)]$$

That is, $C(M)$ is represented by a combination of a desired signal $A(M)$ and other inter-carrier interference (ICI). In Equation 3, ICI is affected by $f(x)$.

Figure 31:
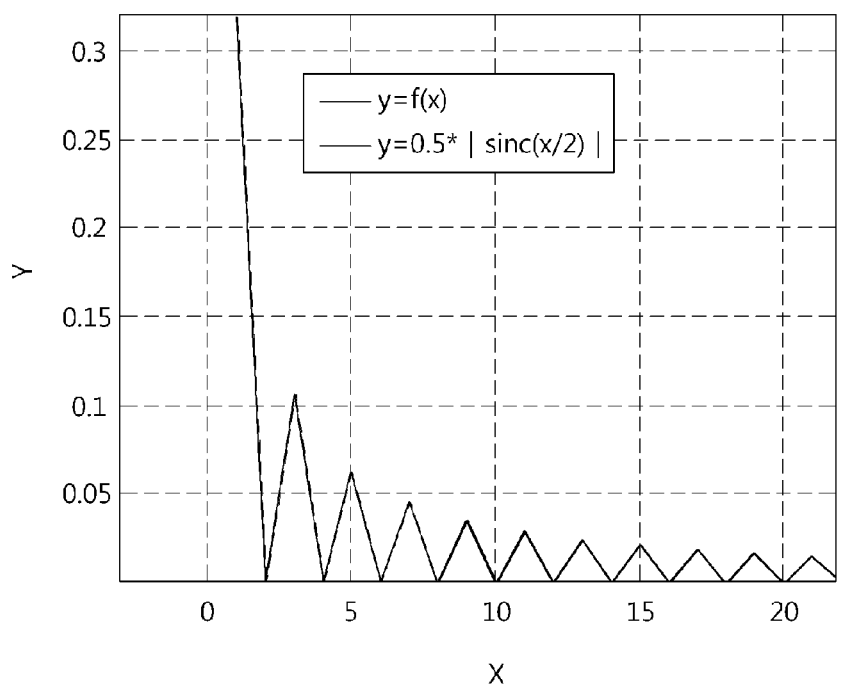
FIG. 31 is a graph illustrating f(x) and sync functions of Equation 3.

FIG. 31 is a graph illustrating $f(x)$ and sync functions of Equation 3.

Referring to FIG. 31, $f(x)$ is similar to the sync function. If x is an even number, $f(x)$ is set to zero. That is, if (k–M) shown in Equation 3 is an even number, $f(k-M)$ is set to zero. Therefore, this means the absence of ICI from a subcarrier (k) that makes (k–M) an even number. In case of the subcarrier (k) that makes (k–M) an odd number, the cyclically copied symbol is loaded on the corresponding subcarrier (k) so that ICI disappears on the condition that $A(k)=B(k)$ is achieved.

That is, the cyclically copied subcarrier receives ICI corresponding to the magnitude of the sync function from a subcarrier that is not cyclically copied. Provided that each of a frequency band (RN band) assigned to a backhaul link between BS and RN and a frequency band (macro access band) assigned to a link between BS and UE is composed of consecutive subcarriers in the frequency domain, the guard subcarrier is located between the RN band and the macro access band, such that the symbol transmitted in the cyclically copied subcarrier can be recovered. Provided that the guard subcarrier is not located between the RN band and the macro access band, ICI affected by the macro access band can be solved through strong channel coding or signal repetition.

Mathematical analysis of signals demodulated by the receiver according to the method for transmitting data using a short block (SB) in the symbol including the guard time will hereinafter be described.

It is assumed that a $k^{th}$ subcarrier signal of a symbol (hereinafter referred to as SB symbol) composed of a short block (SB) is denoted by $A(k)$, and a $k^{th}$ subcarrier signal of a symbol (hereinafter referred to as LB symbol) composed of a long block (LB) is denoted by $B(k)$. As a result, a time-domain signal of the SB symbol is denoted by $a(n)$ and a time-domain signal of the LB symbol is denoted by $b(n)$.

$$a(n) = \sum_{k=0}^{N/2-1} A(k)e^{j4\pi kn/N}, \quad b(n) = \sum_{k=0}^{N-1} B(k)e^{j2\pi kn/N} \quad \text{[Equation 4]}$$

In Equation 4, N is the power of 2 indicating the FFT size. $c(n)$ received by the receiver can be represented by the following equation 5.

$$c(n) = \begin{cases} b(n), & 0 \leq n < N/2 \\ a(n - N/2) + b(n), & N/2 \leq n < N \end{cases} \quad \text{[Equation 5]}$$

The receiver performs N-FFT of the signal $c(n)$ and extracts the $M^{th}$ subcarrier signal so as to decode the LB symbol. The $M^{th}$ subcarrier signal $C(M)$ can be represented by the following equation 6.

$$C(M) = \frac{1}{N}\left[\sum_{n=0}^{N-1} c(n)e^{-j2\pi Mn/N}\right] \quad \text{[Equation 6]}$$

-continued $$= \frac{1}{N}\left[\sum_{n=0}^{N/2-1} b(n)e^{-j2\pi Mn/N} + \sum_{n=N/2}^{N-1}(a(n-N/2)+b(n))e^{-j2\pi Mn/N}\right]$$

$$= \frac{1}{N}\sum_{n=0}^{N/2-1}\left[\sum_{k=0}^{N-1} B(k)e^{j2\pi kn/N}e^{-j2\pi Mn/N}\right] +$$

$$\frac{1}{N}\sum_{n=N/2}^{N-1}\left[\sum_{k=0}^{N/2-1} A(k)e^{j4\pi k(n-N/2)/N}e^{-j2\pi Mn/N} + \sum_{k=0}^{N-1} B(k)e^{j2\pi kn/N}e^{-j2\pi Mn/N}\right]$$

$$= \frac{1}{N}\sum_{k=0}^{N-1}\left[\sum_{n=0}^{N-1} B(k)e^{j2\pi(k-M)n/N}\right] +$$

$$\frac{1}{N}\sum_{k=0}^{N/2-1}\left[\sum_{n=N/2}^{N-1} A(k)e^{j2\pi(2k-M)n/N-j2\pi k}\right]$$

$$= B(M) + \frac{1}{N}\sum_{k=0}^{N/2-1}\left[A(k)\sum_{n=N/2}^{N-1} e^{j2\pi(2k-M)n/N}\right]$$

$$= B(M) + \frac{1}{N}\sum_{k=0}^{N/2-1}\left[A(k)\sum_{n=0}^{N/2-1} e^{j2\pi(2k-M)n/N}e^{j\pi(2k-M)}\right]$$

$$= B(M) + \frac{1}{N}\sum_{k=0}^{N/2-1}\left[A(k)(-1)^{(2k-M)}\sum_{n=0}^{N/2-1} e^{j2\pi(2k-M)n/N}\right]$$

$$= B(M) + \sum_{k=0}^{N/2-1}[A(k)(-1)^{(2k-M)}f(2k-M)]$$

ICI element contained in C(M) is represented by $$\sum_{k=0}^{N/2-1}[A(k)(-1)^{(2k-M)}f(2k-M)].$$

If (2k−M) is set to zero (i.e., k=M/2), the ICI element is represented by A(k). That is, the M/2-th subcarrier of the SB symbol should not be used in order that the M-th subcarrier of the LB symbol can be used. If k is not equal to M/2, the ICI element is determined by f(x).

In order to decode signals of the SB symbol, the receiver applies N/2-FFT to the rear part of the c(n) signal, and then extracts the $M^{th}$ subcarrier signal from the N/2-FFT processed signal. If the $M^{th}$ subcarrier signal of the SB symbol is denoted by C'(M), C'(M) can be represented by the following equation 7.

$$C'(M) = \frac{2}{N}\left[\sum_{n=N/2}^{N-1} c(n)e^{-j4\pi Mn/N}\right]$$ [Equation 7]

$$= \frac{2}{N}\left[\sum_{n=N/2}^{N-1}(a(n-N/2)+b(n))e^{-j4\pi Mn/N}\right]$$

$$= \frac{2}{N}\sum_{n=N/2}^{N-1}\left[\sum_{k=0}^{N/2-1} A(k)e^{j4\pi k(n-N/2)/N}e^{-j4\pi Mn/N} + \sum_{k=0}^{N-1} B(k)e^{j2\pi kn/N}e^{-j4\pi Mn/N}\right]$$

$$= \frac{2}{N}\sum_{k=0}^{N/2-1}\left[\sum_{n=N/2}^{N-1} A(k)e^{j4\pi(k-M)n/N-j2\pi k}\right] +$$

$$\frac{2}{N}\sum_{k=0}^{N-1}\left[\sum_{n=N/2}^{N-1} B(k)e^{j2\pi(k-2M)n/N}\right]$$

$$= \frac{2}{N}\sum_{k=0}^{N/2-1}\left[\sum_{n=0}^{N/2-1} A(k)e^{j4\pi(k-M)n/N}\right] +$$

$$\frac{2}{N}\sum_{k=0}^{N-1} B(k)\left[\sum_{n=N/2}^{N-1} e^{j2\pi(k-2M)n/N}\right]$$

$$= A(M) + \sum_{k=0}^{N-1}[2B(k)(-1)^{(k-2M)}f(k-2M)]$$

The ICI element contained in C'(M) is represented by $$\sum_{k=0}^{N-1}[2B(k)(-1)^{(k-2M)}f(k-2M)].$$

In this case, if (k−2M) is set to zero (i.e., k=2M), B(k) serves as the ICI element. In other words, the $2M^{th}$ subcarrier of the LB symbol should not be used in order that the $M^{th}$ subcarrier of SB symbol can be used.

If k is not identical to 2M, the ICI element is determined by f(x). In comparison with the cyclically copied symbol, the interference averaging effect is removed so that interference power is increased by 3 dB. On the other hand, since one more SB symbol exists in the last symbol of the subframe, utilizing this one more SB symbol can prevent interference power from increasing by 3 dB.

A method for a relay node (RN) transmitting a sounding reference signal (SRS) in the subframe including the guard time according to the embodiments of the present invention will hereinafter be described in detail.

The SRS is a reference signal that is transmitted from either UE or RN to a BS, and is irrelevant to transmission of UL data or control signal. SRS may be utilized to perform channel quality estimation for frequency selective scheduling in uplink (macro uplink or backhaul uplink). SRS may also be used for other purposes. For example, SRS may also be used for power control, initial MCS selection, or initial power control for data transmission.

SRS sequence for use in SRS may be identical to a sequence used in DM RS. The SRS sequence length may be limited to [RB size*(multiple of 2, 3, and/or 5)]. The smallest SRS sequence length may be set to 12. For example, the transmittable SRS band $N_{RB}^{SRS}$ and the SRS sequence length $N_{RB}^{SRS}$ can be represented by the following equation 8.

$$N_{RB}^{SRS} = 2^{(1+\alpha_2)} \cdot 3^{\alpha_3} \cdot 5^{\alpha_5}$$ [Equation 8]

$$M_{sc}^{SRS} = \frac{1}{2} \cdot N_{RB}^{SRS} \cdot 12$$

In Equation 8, α2, α3, and α5 are a set of positive integers. SRS can maintain orthogonal property by applying different cyclic shift (CS) values to the same basic sequence while using the same RB and the same subcarriers. The CS value may be differently established per UE or RN.

An exemplary case in which the UE transmits a macro SRS to a BS, and subsequently an embodiment of the present invention will hereinafter be described in detail.

Figure 32:
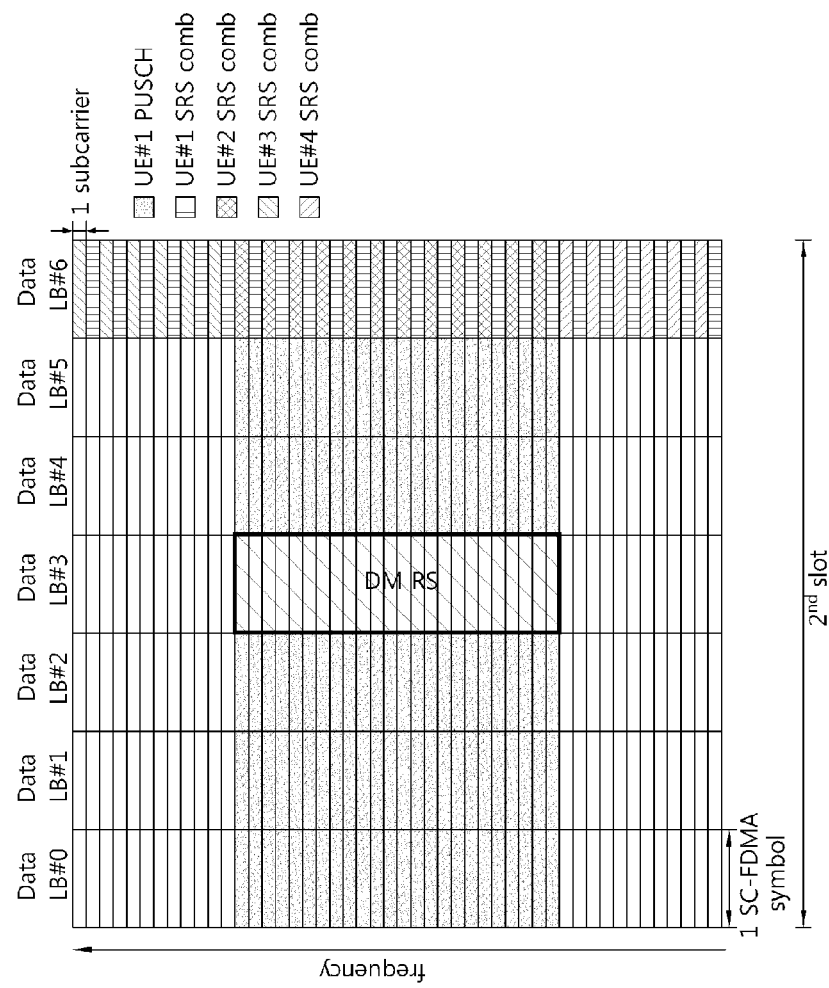
FIG. 32 shows an example in which a plurality of UEs transmit a macro SRS to a base station (BS)

FIG. 32 shows an example in which a plurality of UEs transmit a macro SRS to a base station (BS).

Referring to FIG. 32, UE #1 transmits the macro SRS through one of every second subcarriers (i.e., comb-shaped subcarriers) across the entire frequency band. UEs #2~#4 may transmit the macro SRS through the comb-shaped subcarrier within the SRS band assigned to the UEs #2~#4 (i.e., SRS transmission band). As such, the operation for allocating the subcarrier in the shape of a comb may also be referred to as interleaved FDMA. In addition, if each UE uses LB in the SC-FDMA symbol through which the macro SRS is transmitted, SRS may be repeatedly transmitted two times.

Figure 33:
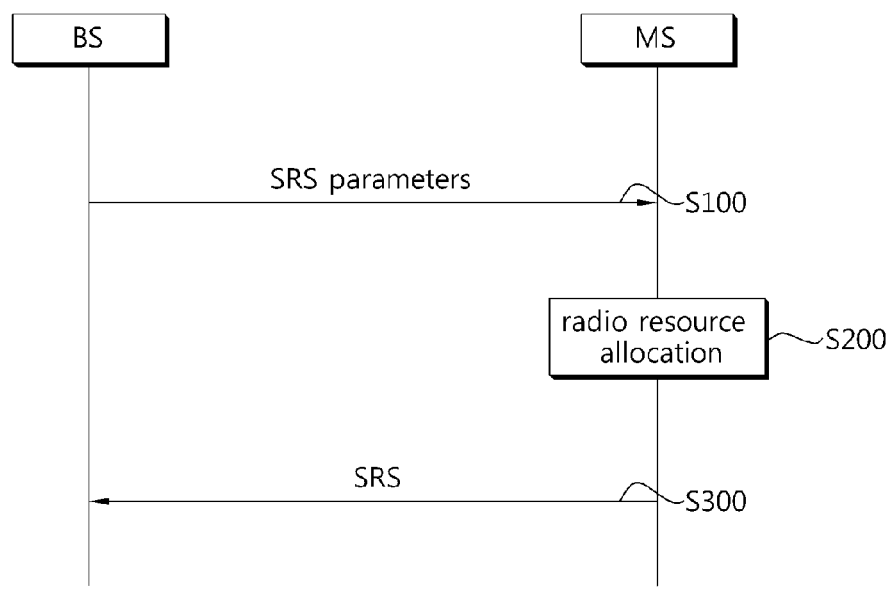
FIG. 33 is a conceptual diagram illustrating a method for transmitting a sounding reference signal (SRS) by a relay node (RN) according to one embodiment of the present invention.

FIG. 33 is a conceptual diagram illustrating a method for transmitting a sounding reference signal (SRS) by a relay node (RN) according to one embodiment of the present invention.

Referring to FIG. 33, the SRS transmission method of the RN includes a step (S100) for receiving SRS parameters from the BS, a step (S200) for allocating radio resources using SRS parameters by the RN, and a step (S300) for transmitting SRS to the BS through the allocated radio resources. In this case, radio resources indicated by SRS parameters may include the symbol including a guard time in the time domain. The above-mentioned steps S100, S200 and S300 will hereinafter be described in detail.

In step S100, SRS parameters transmitted from the BS to the RN are exemplarily shown in the following table 1.

TABLE 1

| SRS parameter | Meaning | Signaling type |
|---|---|---|
| srsBandwidthConfiguration | Maximum SRS bandwidth in the cell | Cell specific |
| srsSubframeConfiguration | Sets of subframes in which SRS may be transmitted in the cell | Cell specific |
| srsBandwidth | SRS transmission bandwidth of RN | RN specific |
| frequencyDomainPosition | Frequency domain position | RN specific |
| srsHoppingBandwidth | Frequency hop size | RN specific |
| Duration | Indicating whether single SRS or periodic SRS | RN specific |
| srsConfigurationIndex | Periodicity and subframe offset | RN specific |
| transmissionComb | Transmission comb offset | RN specific |
| $n_{SRS}^{CS}$ | Cyclic shift | RN specific |
| srsResourcetype | Indicating type of RB used for SRS transmission | Cell specific or RN specific |

In Table 1, 'srsBandwidthConfiguration' indicates a maximum bandwidth through which SRS can be transmitted in the cell.

'srsSubframeConfiguration' indicates the set of subframes through which SRS can be transmitted within each radio frame. 'srsSubframeConfiguration' is a cell-specific broadcast signal transmitted to the RN located in the cell. For example, 'srsSubframeConfiguration' may be composed of 4 bits. SRS can be transmitted in the last SC-FDMA symbol within the subframes through which SRS can be transmitted. In the SC-FDMA symbol through which SRS is transmitted, backhaul uplink data transmission of the RN may be disallowed.

'srsBandwidth' indicates the SRS transmission bandwidth of the RN. The SRS transmission bandwidth may be determined according to transmission power of the RN, the number of RNs capable of being supported by the BS, etc. The SRS transmission bandwidth of the RN indicated by 'srsBandwidth' will be described later in detail.

'Duration' is a parameter indicating whether the BS requests one-time SRS transmission to the RN or establishes periodic SRS transmission. By means of the 'duration' parameter, the RN may transmit the SRS only once or may periodically transmit the SRS to the BS.

'transmissionComb' indicates which subcarrier the SRS transmitted from the RN is allocated to. In order to support frequency selective scheduling in a multi-user environment, it is necessary that SRS can be transmitted from different UEs or RNs, and SRSs having different SRS bandwidths can overlap with each other. In order to support this, interleaved FDMA (IFDMA) having a repetition factor (RPF) of 2 is used in the SC-FDMA symbol through which SRS is transmitted. For example, it is possible to indicate information as to whether SRS is transmitted through an odd-th subcarrier within the SRS transmission band or SRS is transmitted through an even-th subcarrier. RPF in the time domain is used as a decimation factor in the frequency domain. Since SRS is repeatedly transmitted two times in the time domain through the SC-FDMA symbol for SRS transmission, each subcarrier for SRS transmission has a comb-like spectrum. In other words, the subcarrier for SRS transmission is composed of even-th subcarriers only (or odd-th subcarriers only) in the assigned sounding band. Because of the IFDMA structure of the symbol for SR transmission, the 'transmissionComb' parameter is assigned to the RN. The 'transmissionComb' parameter is exemplarily set to 0 or 1, and exemplarily indicates where SRS is transmitted. However, the 'transmissionComb' parameter may indicate which one of four subcarriers (e.g., $4n^{th}$ subcarrier, $(4n+1)^{th}$ subcarrier, $(4n+2)^{th}$ subcarrier, and $(4n+3)^{th}$ subcarrier) the SRS is assigned to. In this case, the SRS occupies a ¼ symbol in the time domain.

The 'srsResourcetype' parameter indicates whether a resource block (RB) to which SRS is allocated is LB or SB. That is, depending on the 'srsResourcetype' parameter, the RN may assign the SRS to a short block (SB) or may also assign the SRS to a long block (LB).

The RN allocates radio resources using the above-mentioned SRS parameters.

Figure 34:
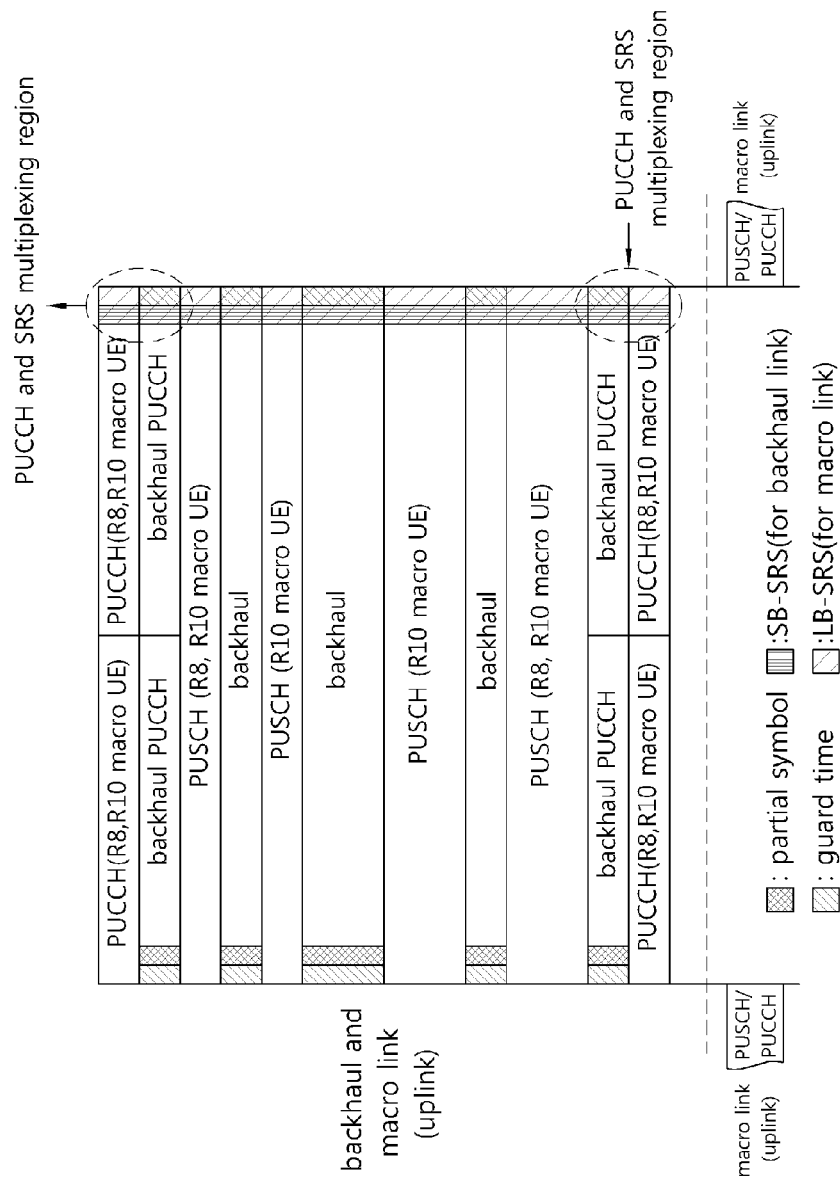
FIG. 34 shows an exemplary uplink subframe structure via which a relay node (RN) transmits an SRS.

FIG. 34 shows an exemplary uplink subframe structure via which a relay node (RN) transmits an SRS.

Referring to FIG. 34, PUCCH through which a UE uplink control signal is transmitted may be assigned to resource blocks (RBs) located at boundaries in the frequency domain of the UL subframe, and backhaul PUCCH through which the RN transmits a backhaul uplink control signal may be assigned adjacent to the PUCCH. In this case, the backhaul PUCCH may be located adjacent to the PUCCH. A backhaul PUCCH region or a backhaul PUSCH region (i.e., indicated as 'backhaul' in FIG. 34) through which backhaul uplink data is transmitted may include guard times at boundaries of the subframe. Therefore, the RN may have difficulty in using the entire last symbol of the subframe. If the RN transmits the SRS to the BS, the RN may use only some portion of the last symbol. For example, SB may be assigned to the front part of the last symbol, and it is also possible to transmit SRS (SB-SRS) using such SB. The SB-SRS may indicate the SRS assigned to the SB.

In contrast, UE can transmit the macro SRS using the entire symbol because the guard time is not contained in the last symbol of the subframe. That is, the UE can transmit SRS (LB-SRS) using LB. LB-SRS may represent SRS allocated to a general normal symbol. In this case, whether RN is going to transmit the SRS even in the frequency band to which PUCCH is assigned may be an issue.

FIGS. 35 to 38 show exemplary SRS transmission bands of a relay node (RN) capable of being established by 'srsBandwidth' parameter.

Figure 35:
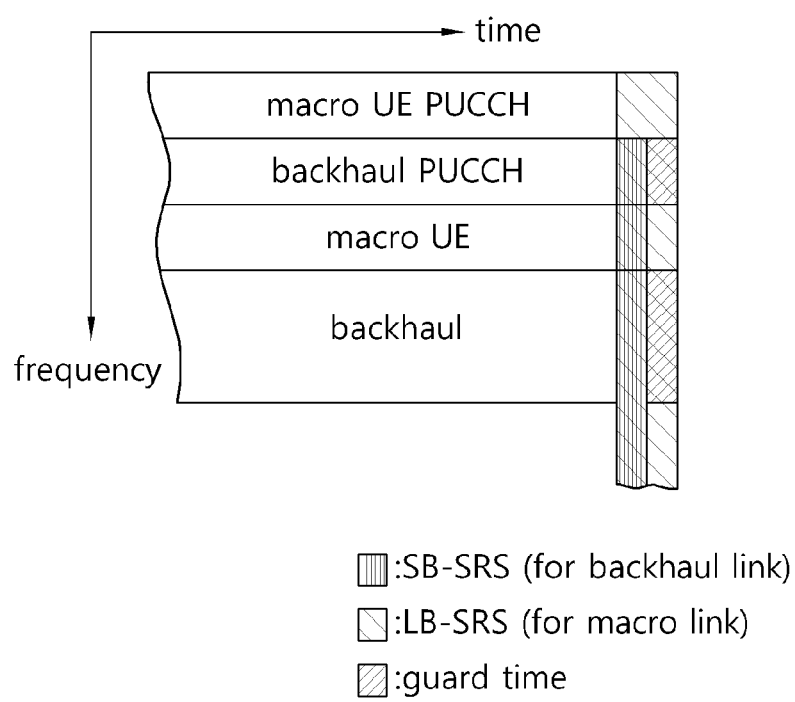
FIGS. 35 to 38 show exemplary SRS transmission bands of a relay node (RN) capable of being established by 'srsBandwidth' parameter.
Figure 36:
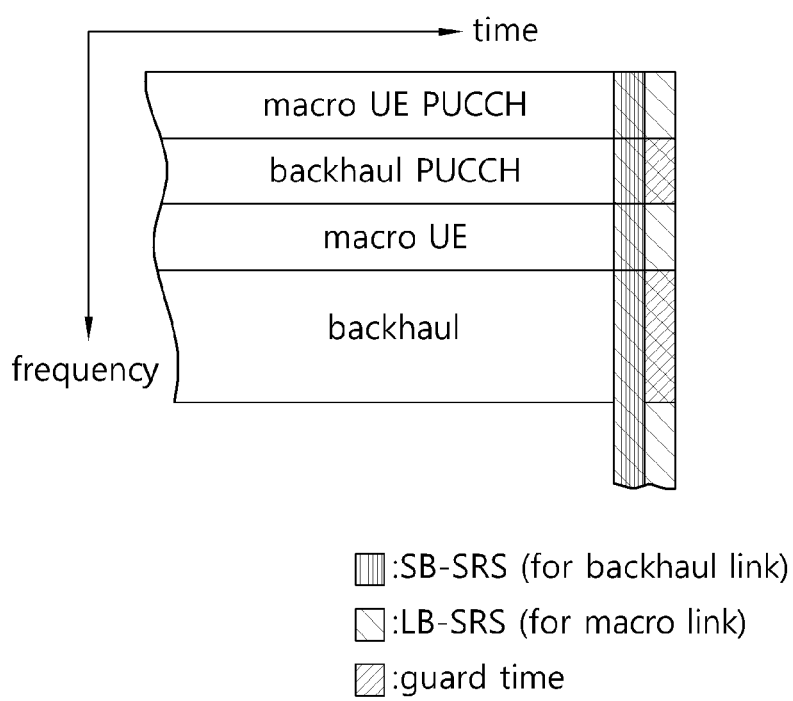

FIG. 35 shows that a PUCCH region of the UE is excluded from a transmission band of the SRS transmitted by the RN. FIG. 36 shows that a transmission band of the SRS transmitted by the RN includes a PUCCH region of the UE.

Figure 37:
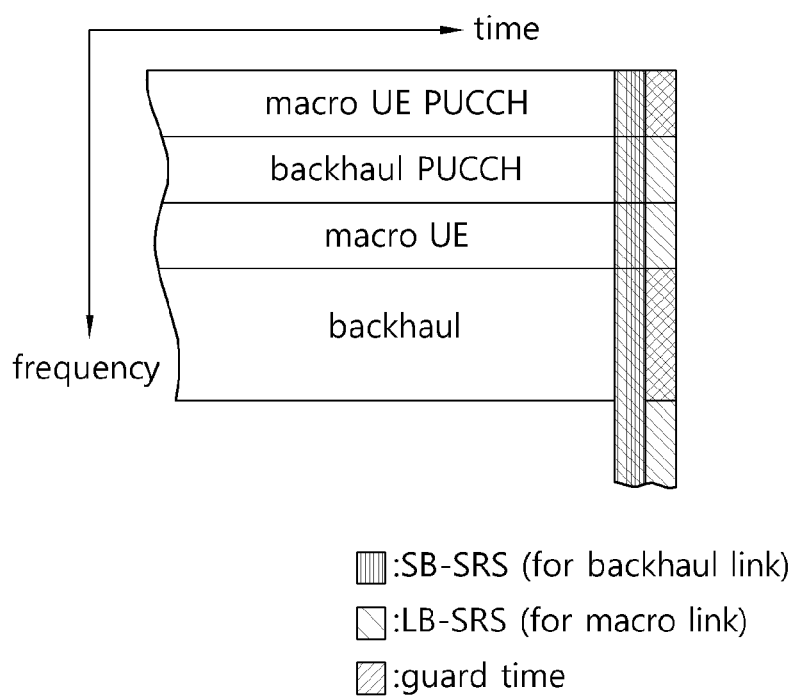
Figure 38:
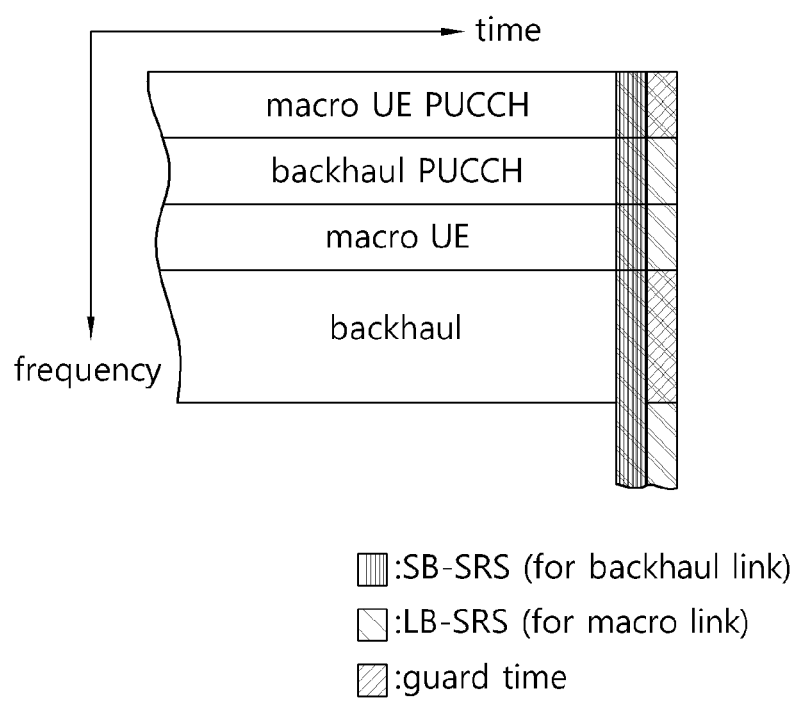

FIGS. 37 and 38 show that a backhaul PUCCH is located at a boundary of the frequency band of the subframe. In this case, a backhaul PUCCH region may be excluded from the SRS transmission band transmitted by the RN as shown in FIG. 37, or may be contained in the SRS transmission band as shown in FIG. 38. In addition, SRS may not be transmitted in a transmission band of the backhaul PUCCH. As a result, puncturing of the last symbol of the backhaul PUCCH region by the macro SRS may be avoided.

SB SRS is diffused by CAZAC (Constant amplitude zero autocorrelation) or Zadoff-Chu sequences in the same manner as in LB SRS, such that interference can be reduced and low PAPR/CM characteristics can be maintained. Specifically, in order to obtain a high processing gain by such sequences, the SB SRS and the LB SRS may have the same transmission band and the same frequency position as necessary.

Transmission band, transmission comb, cyclic shift (CS), hopping rule, etc. of the SB SRS may be notified to the RN by the SRS parameters. In this case, a new rule may be defined, and the rule for use in the LB SRS may be equally used and only newly requested parameters may be added as necessary.

A method for transmitting the SRS to the RN through radio resources allocated by SRS parameters and a method for receiving the SRS at the BS will hereinafter be described in detail.

Figure 39:
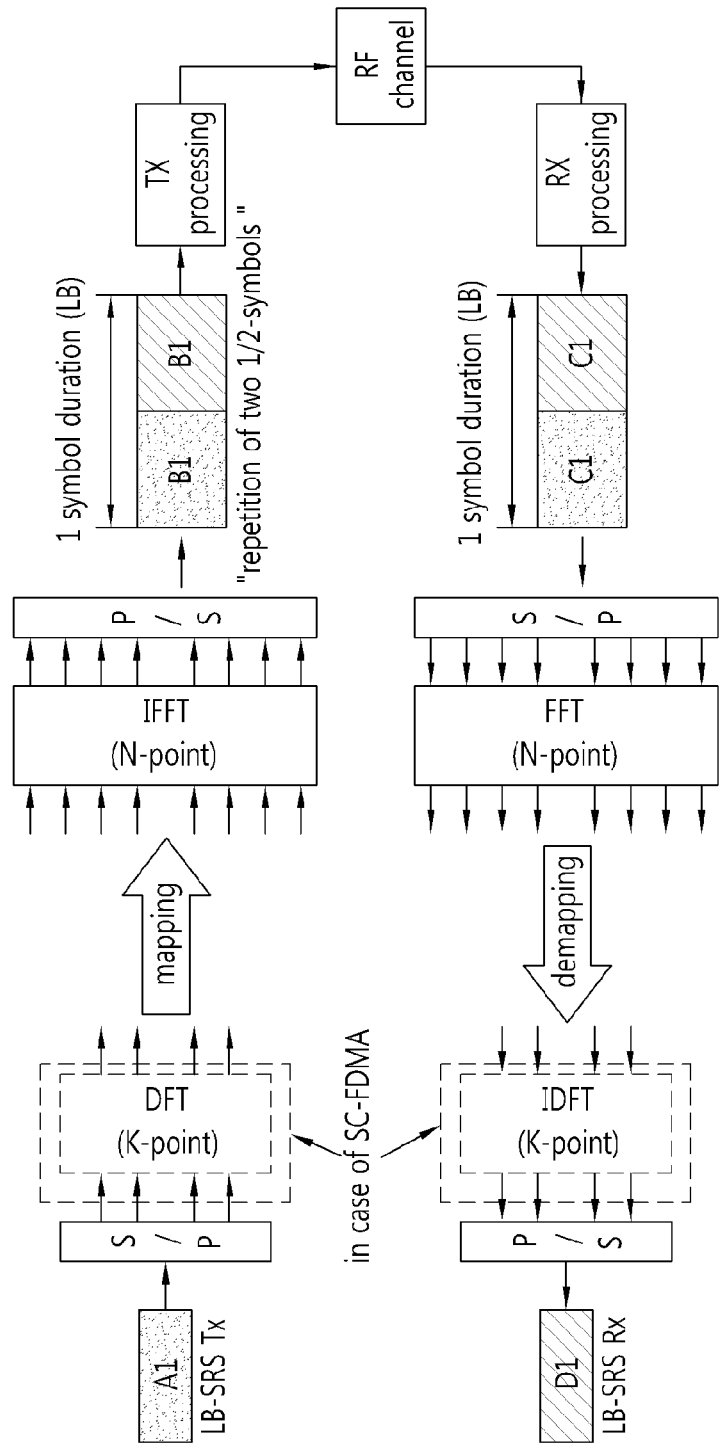
FIG. 39 is a conceptual diagram illustrating a method for enabling a relay node (RN) (or UE) to generate and transmit a long-block (LB) SRS and a method for enabling a base station (BS) to receive a long-block (LB) SRS.

FIG. 39 is a conceptual diagram illustrating a method for enabling a relay node (RN) (or UE) to generate and transmit a long-block (LB) SRS and a method for enabling a base station (BS) to receive a long-block (LB) SRS.

Referring to FIG. 39, the RN converts 'A1' indicating the LB SRS to be transmitted into a parallel signal, performs DFT (Discrete Fourier Transform) processing of the parallel signal, and maps the DFT-processed result to the subcarrier. Thereafter, the resultant signal is N-point IFFT (Inverse Fast Fourier Transform)—processed such that it is converted into a serial signal. As a result, the signal A1 to be transmitted by the RN is repeated in one symbol two times (B1 is repeated two times).

The BS sequentially performs N-point FFT, subcarrier demapping, and IDFT of signals received through a radio frequency (RF) channel, such that the LB SRS can be recovered.

Figure 40:
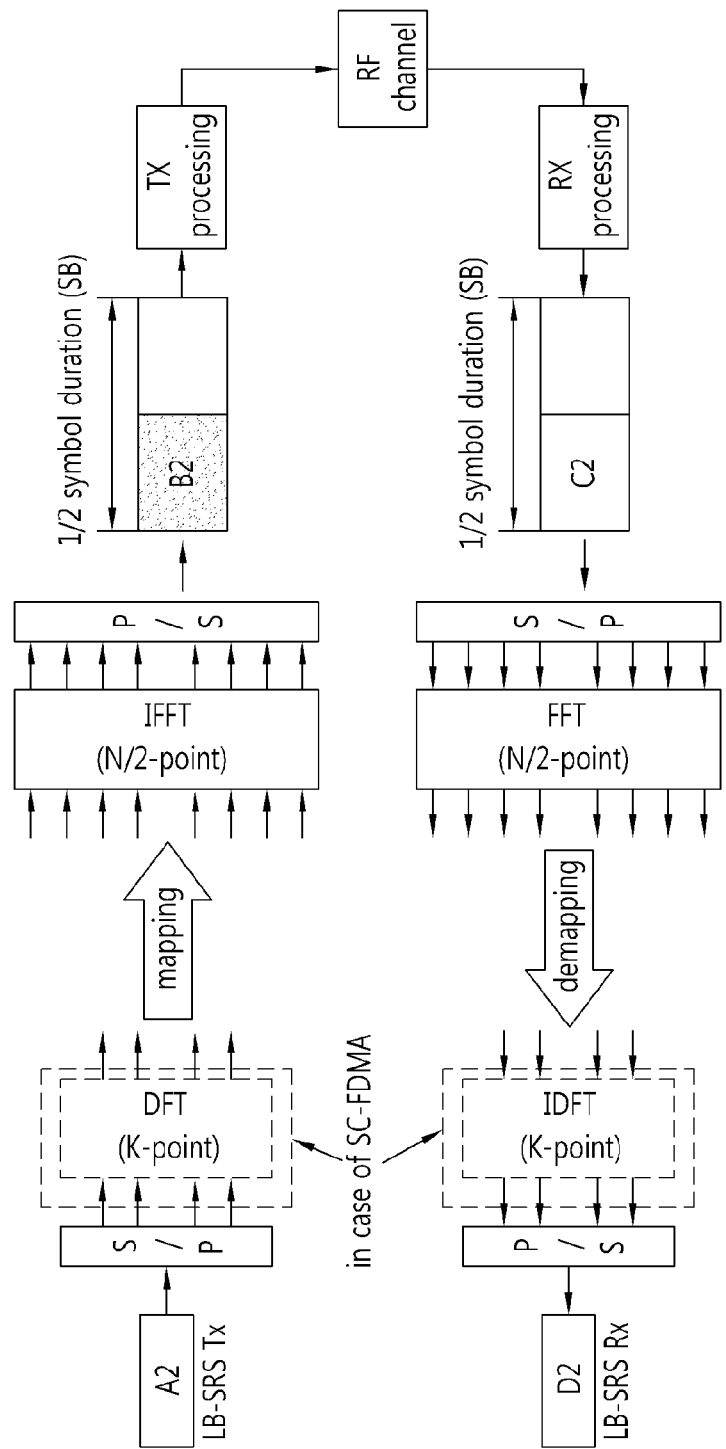
FIG. 40 is a conceptual diagram illustrating a method for enabling a relay node (RN) to generate and transmit a short-block (SB) SRS and a method for enabling a base station (BS) to receive a short-block (SB) SRS.

FIG. 40 is a conceptual diagram illustrating a method for enabling a relay node (RN) to generate and transmit a short-block (SB) SRS and a method for enabling a base station (BS) to receive a short-block (SB) SRS.

In comparison with FIG. 39, when A2 indicating the SB SRS is IFFT-processed, the A2 signal is N/2-point-IFFT-processed rather than N-point-IFFT-processed. In other words, the number of sampling points of the SB SRS is a half of the number of sampling points of the LB SRS. As a result, the SB SRS is located only at a ½ symbol of one symbol (See 'B2'). In addition, the BS performs N/2-point FFT, subcarrier demapping, and IDFT of signals received through the RF channel, such that the SB SRS can be recovered.

Figure 41:
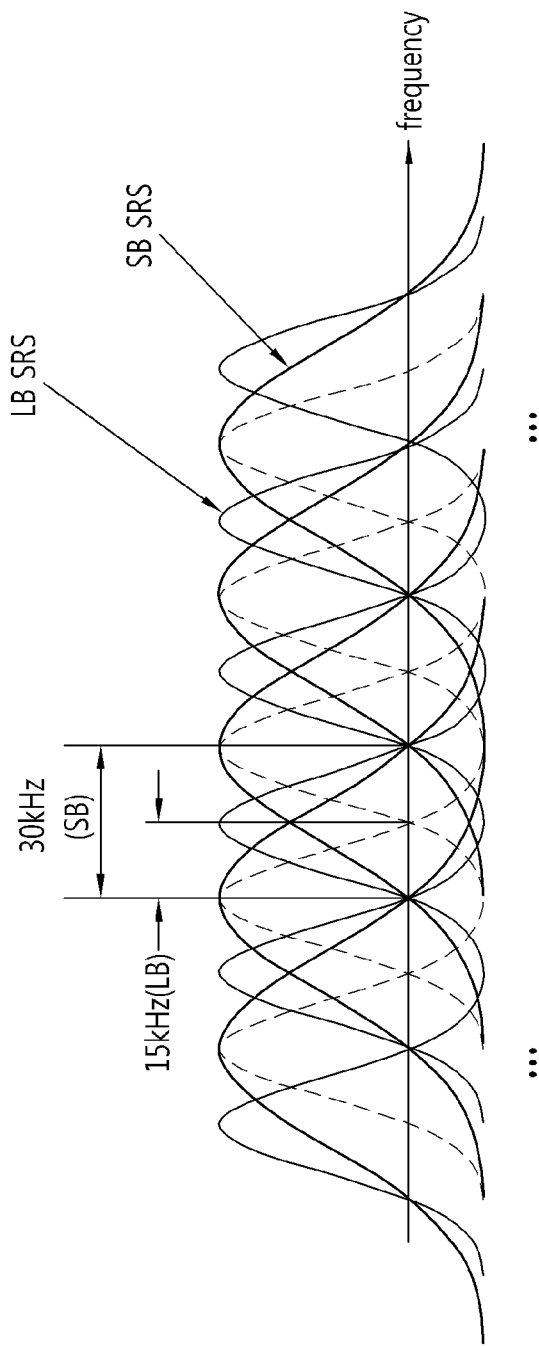
FIG. 41 shows the comparison result between subcarrier waveforms and subcarrier spacing's of LB SRS and SB SRS.

FIG. 41 shows the comparison result between subcarrier waveforms and subcarrier spacing of LB SRS and SB SRS.

Referring to FIG. 41, the LB SRS is assigned to the odd-th subcarriers (or the even-th subcarriers) among subcarriers each having the subcarrier spacing of 15 kHz. SB SRS is assigned to subcarriers each having the subcarrier spacing of 30 kHz.

Therefore, although the LB SRS, the SB SRS, or assigned subcarriers have the same spacing of 30 kHz, the LB SRS and the SB SRS may have different waveforms in the frequency domain. That is, each subcarrier is configured in the form of the sync function in the frequency domain. When comparing spacing between zero crossing points of the SB SRS with spacing between zero crossing points of the LB SRS, the spacing between the zero crossing points of the SB SRS is two times larger than that of the LB SRS. In this case, the zero crossing point indicates a specific point at which the value of the function is equal to zero. Therefore, the value of each subcarrier for SB SRS transmission is not equal to the exact zero value at a specific point at which each subcarrier for LB SRS transmission has a maximum value. However, the set value is not high to be significantly considered, influence caused by the corresponding value is not considerable.

Figure 42:
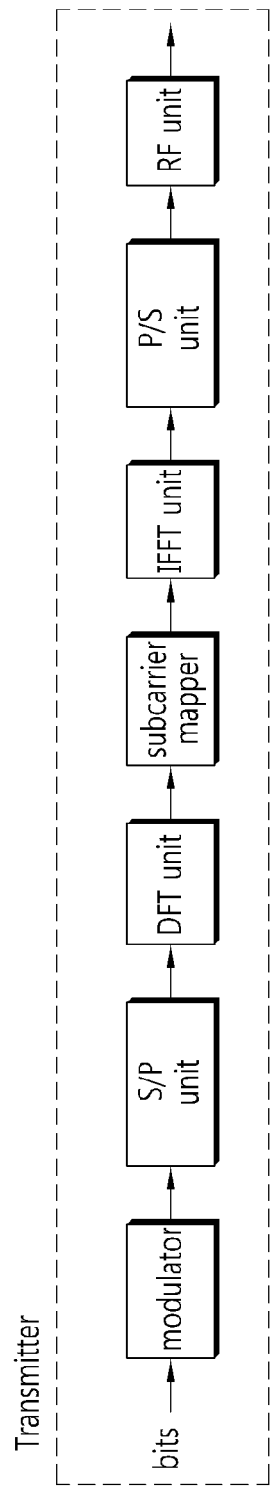
FIG. 42 is a block diagram illustrating a transmitter according to one embodiment of the present invention.

FIG. 42 is a block diagram illustrating a transmitter according to one embodiment of the present invention.

Referring to FIG. 42, the transmitter may be some parts of the RN. The transmitter may include a modulator, a DFT unit, a subcarrier mapper, an IFFT unit, and an RF unit.

The modulator maps the coded bit into symbols indicating the position of signal constellation, such that it generates the modulated symbols. There is no limitation in the modulation scheme. For example, the modulation scheme may be m-Phase Shift Keying (m-PSK) or m-Quadrature Amplitude Modulation (m-QAM). The modulated symbols are input to the DFT unit. The DFT unit performs DFT processing of the input symbols, such that it outputs a complex-valued symbol. For example, if K symbols are input, the DFT size is K (K is a natural number).

The subcarrier mapper maps the complex-valued symbols to each subcarrier of the frequency domain. The complex symbols may be mapped to resource elements (REs) corresponding to RBs allocated for data transmission. The IFFT unit performs IFFT processing of the input symbol, such that it outputs a baseband signal corresponding to data in the time domain. Provided that the IFFT size is denoted by N, N can be determined by a channel bandwidth (where N is a natural number). The CP insertion unit (not shown) copies some portion of the rear part of the baseband signal for data, and inserts the copied result into the position located prior to the baseband signal for data. Such CP insertion prevents the occurrence of ISI (Inter Symbol Interference) or ICI (Inter Carrier Interference), such that orthogonality can be maintained even in a multi-path channel.

As described above, the scheme for performing IFFT upon completion of the DFT spreading will hereinafter be referred to as a single-carrier frequency division multiple access (SC-FDMA). The SC-FDMA may also be referred to as DFTS-OFDM (DFT spread-OFDM). In case of using SC-FDMA, peak-to-average power ratio (PAPR) or cubic metric (CM) can be reduced. In case of using the SC-FDMA transmission scheme, transmission power efficiency may be increased.

Figure 43:
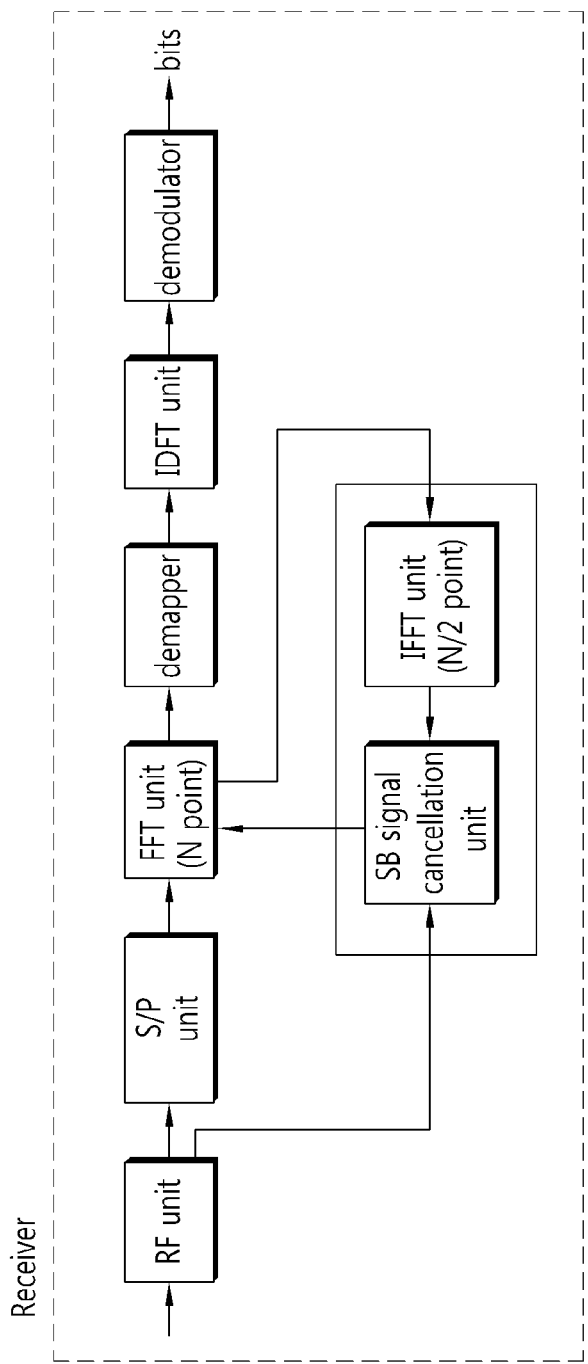
FIG. 43 is a block diagram illustrating a receiver serving as one part of the base station (BS) according to one embodiment of the present invention.

FIG. 43 is a block diagram illustrating a receiver according to one embodiment of the present invention. The receiver may be one part of the base station (BS).

The receiver may include an RF unit, an FFT unit, a demapper, and an IDFT unit. In addition, the receiver may include an IFFT unit and an SB signal cancellation unit.

The RF unit may include at least one antenna, and receives an RF signal through an RF channel. The received RF signal is converted from a serial signal into a parallel signal, and is then converted into a frequency-domain signal by the FFT unit. The frequency-domain signal is converted into a time-domain signal after passing through the demapper and the IDFT unit.

The IFFT unit converts the reception signal having been converted into to the frequency-domain signal by the FFT unit into the time-domain signal. In this case, provided that the FFT unit performs N-point FFT processing, the IFFT unit can perform N/2-point IFFT processing. The SB signal cancellation unit subtracts the SB signal received from the IFFT unit from the signal received through the RF unit. That is, the SB signal cancellation unit can remove the SB signal from the signal received through the RF unit.

Figure 44:
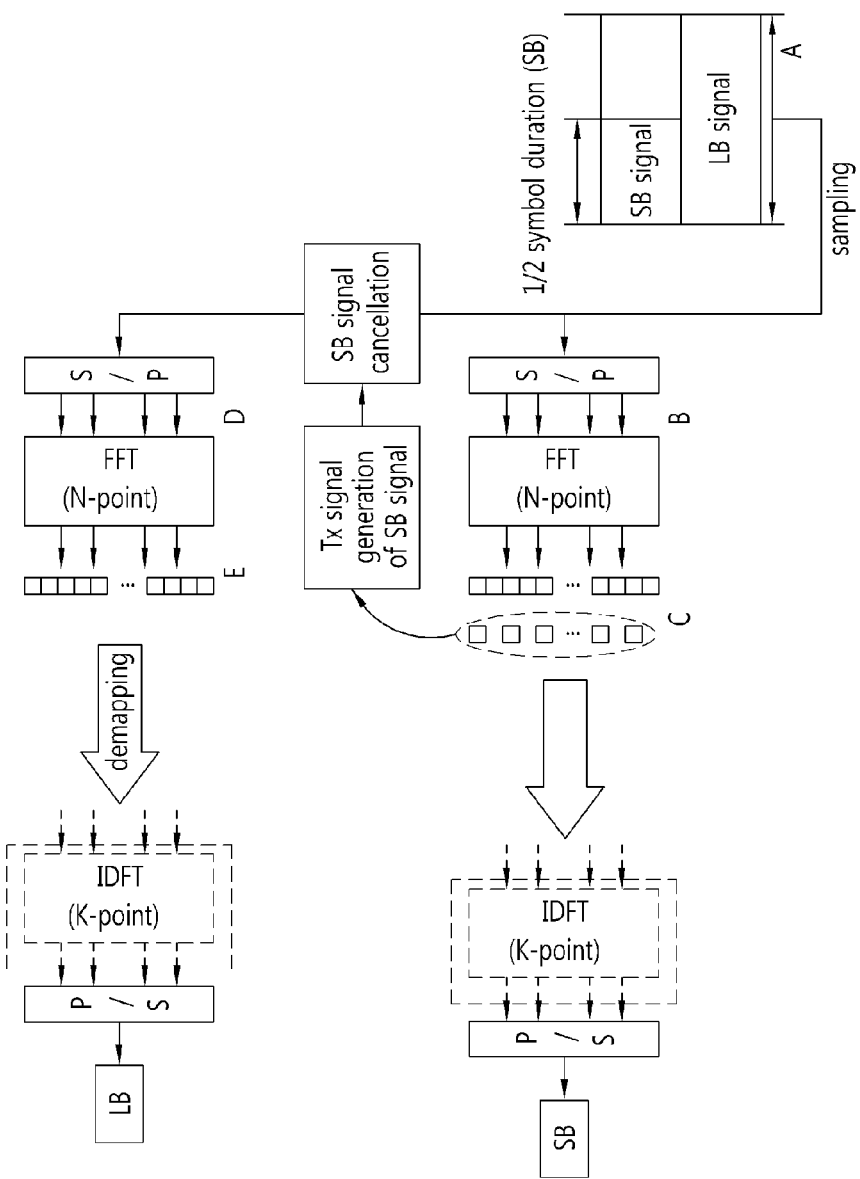
FIG. 44 is a conceptual diagram illustrating a method for processing two SRSs when a receiver of the base station (BS) simultaneously receives a long-block SRS (LB SRS) and a short-block SRS (SB SRS)

FIG. 44 is a conceptual diagram illustrating a method for processing two SRSs when a receiver of the base station (BS) simultaneously receives a long-block SRS (LB SRS) and a short-block SRS (SB SRS).

Referring to FIG. 44, the BS can simultaneously receive the LB SRS transmitted from the UE and the SB SRS transmitted from the RN at the last symbol of the subframe. That is, the analog signal (the signal of 'A' point) received by the RF unit may be a combination of the LB signal and the SB signal.

In this case, the receiver performs sampling of the analog signal, and converts the sampled signal into a parallel signal (the signal of 'B' point). Thereafter, the receiver performs N-point FFT of the parallel signal. For example, if the carrier band is 20 MHz, the number of input signal samples for FFT processing may be set to 2048. The receiver can obtain 1024 samples (that can be obtained by obtaining signals of the even-th or odd-th carrier) from the signal obtained by FFT processing. The 1024 samples may correspond to SB signal samples (See the signal of 'C' point). SB signal samples are recovered to the SB signal through IDFT processing.

It is impossible to directly obtain the LB signal contained in the A-point signal from the sampled signal because both the SB signal and the LB signal are contained in the sampled signal. Therefore, additional processing is needed to extract only LB signal samples.

As described above, the C-point signal corresponds to the SB signal samples. The receiver generates the SB signal samples as the same signal as that of the SB signal generated by the transmitter. The receiver subtracts the generated SB signal from the A-point signal, such that it can remove interference caused by the SB signal from the A-point signal. Needless to say, the above-mentioned process can also be implemented by removing the SB signal from the B-point signal but not the A-point signal.

The receiver converts the signal from which the SB signal is removed into a parallel signal (i.e., D-point signal), and performs N-point FFT processing (i.e., E-point signal). Thereafter, the receiver recovers the LB signal through IDFT processing.

The frequency-domain signals at A, B, C, and E points in the receiver of FIG. 44 will hereinafter be described in detail.

Figure 45:
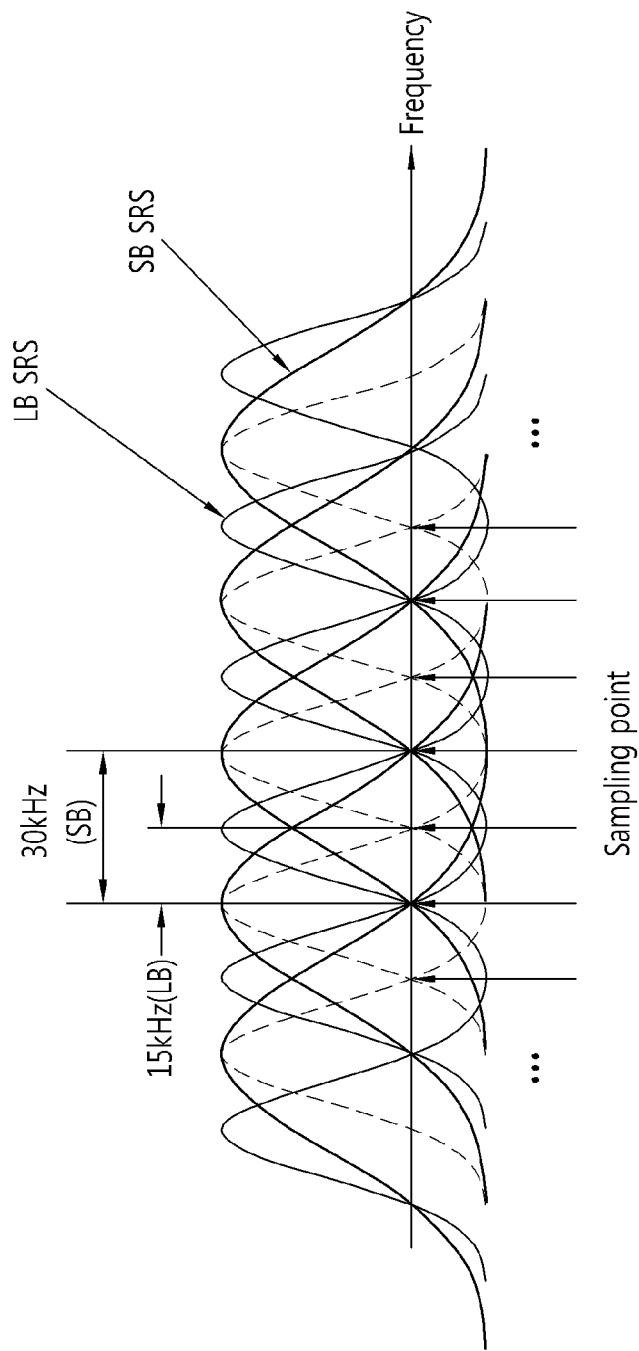
FIG. 45 shows signals in the frequency domain at a processing point A of the receiver shown in FIG. 44.

FIG. 45 shows signals in the frequency domain at a processing point A of the receiver shown in FIG. 44. FIG. 45 shows waveforms of individual subcarriers in parallel, instead of actual waveforms of LB SRS or SB SRS. The actual waveforms are identical to the sum of individual subcarriers. LB SRS and SB SRS have the same subcarrier spacing of 30 kHz, but they have different waveforms in the frequency domain. SB SRS has a wider zero-crossing-point spacing. The sampling points at the A-point signal may have 15 kHz spacing.

Figure 46:
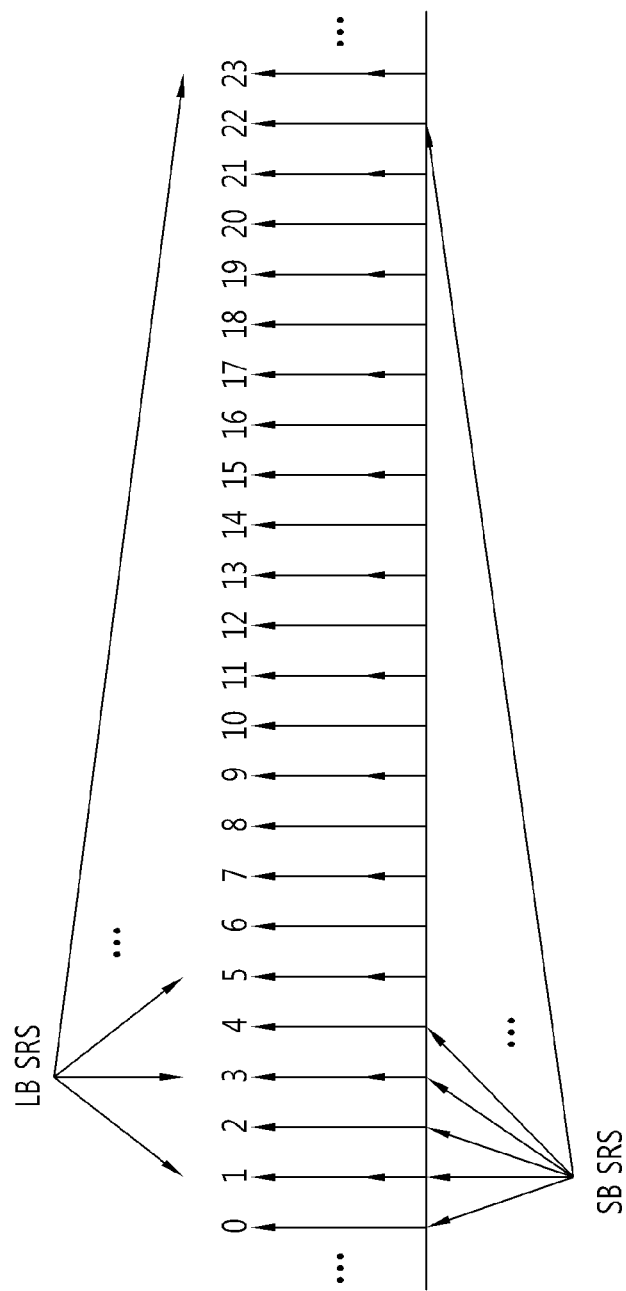
FIGS. 46 to 48 show signals in the frequency domain at processing points B, C and E of the receiver shown in FIG. 44.
Figure 47:
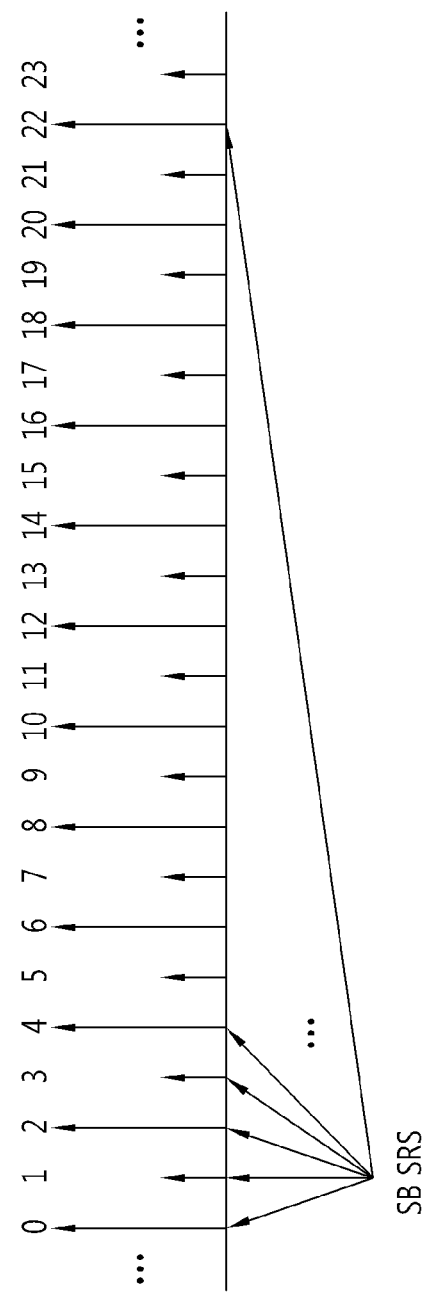
Figure 48:
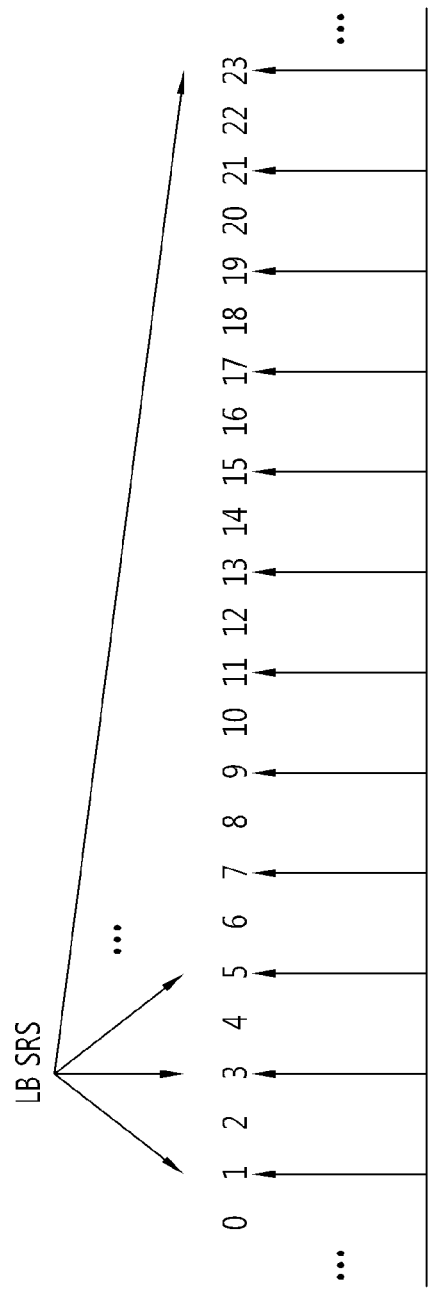

FIGS. 46 to 48 show signals in the frequency domain at processing points B, C and E of the receiver shown in FIG. 44.

Referring to FIG. 46, LB SRS and SB SRS are mixed at the B point. For example, LB SRS may have a value at the odd-th subcarrier, and SB SRS may have a value at the even-th and odd-th subcarriers. SB SRS may also have the value at the odd-th subcarrier, such that interference with LB SRS may occur.

Referring to FIG. 47, the C-point signal has a value at each of the even-th subcarrier and the odd-th subcarrier. That is, the C-point signal may include only the SB SRS. Referring to FIG. 48, the E-point signal (i.e., N-point FFT-processed signal) may include only the LB SRS.

As described above, SRS transmitted from the RN to the BS may be assigned only to the front ½ symbol of the last symbol of the subframe including the guard time, and then transmitted. The above-mentioned method can prevent the SRS from being deteriorated by the guard time contained in the last symbol of the subframe.

According to embodiments of the present invention, transmission capacity of the backhaul link is increased, because radio resources, which may be wasted due to a guard time if signal is transmitted with LB, can be used for backhaul link signal transmission. Provided that the RN does not transmit the SRS at the last symbol of the subframe, the RN must transmit the SRS at the remaining symbols other than the last symbol. Therefore, the RN must puncture the symbol for SRS transmission, such that the symbol to be used for backhaul data transmission is punctured.

The above-mentioned description has disclosed the example in which the RN transmits the SRS using a short block in the last symbol of the subframe including the guard time (SB). However, the scope or spirit of the present invention is not limited thereto. That is, the present invention can also be applied to the exemplary case in which data is transmitted at the last symbol. In addition, the present invention can also be applied to a general symbol, i.e., on the condition that the guard time is not contained in the last symbol. For example, the present invention can be applied to the half symbol (½ symbol) after the general symbol is cut in half.

The above-mentioned example has disclosed that SB SRS (e.g., SRS having the ½ symbol length) is used in the front part of the last symbol of the subframe. However, SB SRS may also be located at the rear part of the last symbol of the subframe. Signal processing for use in the exemplary case in which the SB SRS is located at the rear of the last symbol is identical or similar to the signal processing for use in the exemplary case in which the SB SRS is located at the front of the last symbol. Therefore, the signal processing for transmitting the SB SRS in the rear part of the last symbol may use FIGS. 7 to 47 without change, or the signal processing may be properly modified and utilized as necessary.

A scenario for transmitting the SB SRS in the rear part of the last symbol, and its associated signaling method will hereinafter be described with reference to FIGS. 48 to 54.

Referring to FIG. 1, in case of constructing the network including the RN, various synchronization schemes are used to increase the radio link efficiency between the RN and the BS. One synchronization scheme is designed to match a boundary of the uplink subframe received from the RN to the BS to an uplink subframe boundary of the BS. The above-mentioned case in which two subframe boundaries are identical to each other is considered to be 'aligned case'. In the meantime, provided that the RN is a half-duplex RN, the half-duplex RN is unable to simultaneously perform DL reception and DL transmission using the same carrier. Therefore, the RN must perform switching between two transmission modes to operate the two transmission modes. In order to perform switching between the two transmission modes, a specific time (i.e., Tx-to-Rx or Rx-to-Tx switching time) is needed. The time loss caused by the transmission mode switching may be obtained from the backhaul link, or may also be obtained from the RN access link. If the time loss is obtained from the backhaul link, some portion of the backhaul symbol are configured in the form of a guard time such that they can be used for the switching time. The symbol in which the guard time is established cannot be used for data transmission, such that the symbol is unavoidably wasted.

Figure 49:
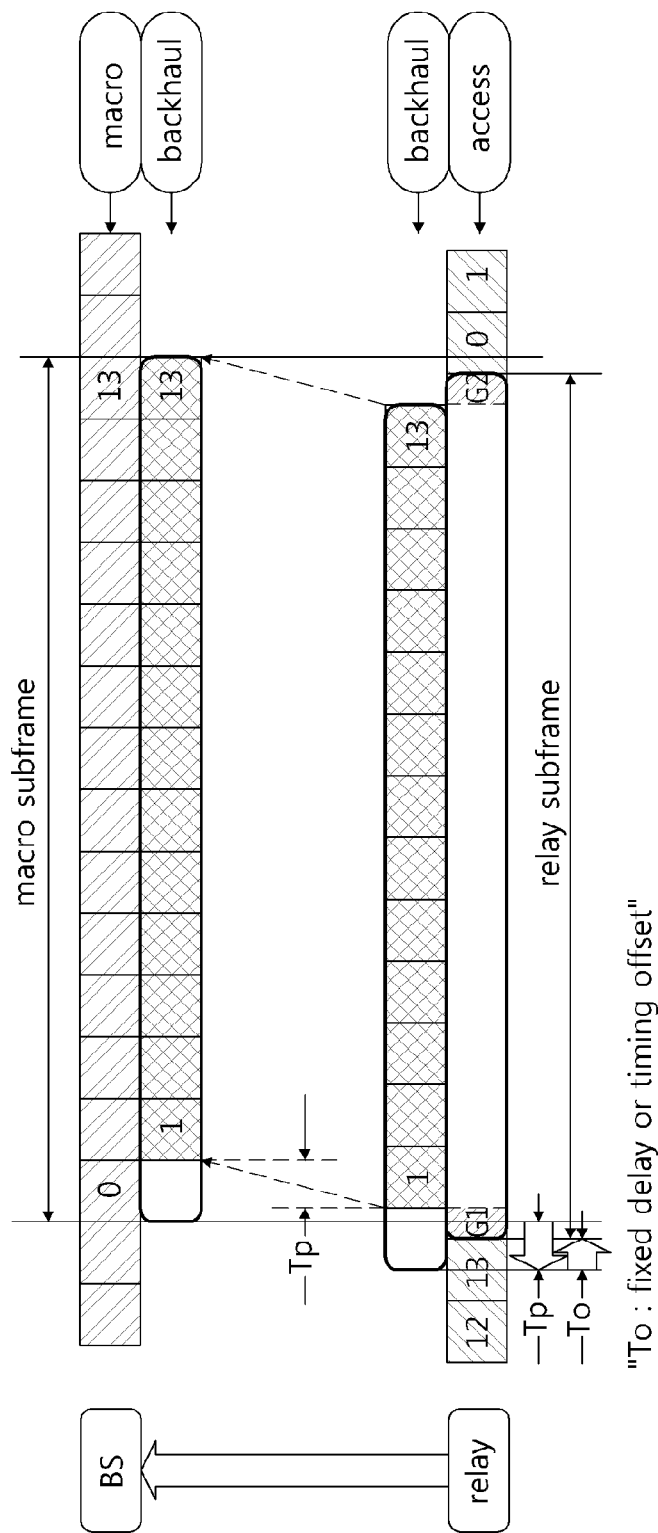
FIGS. 49 to 51 are conceptual diagrams illustrating a method for preventing waste of resources caused by allocating guard time.
Figure 50:
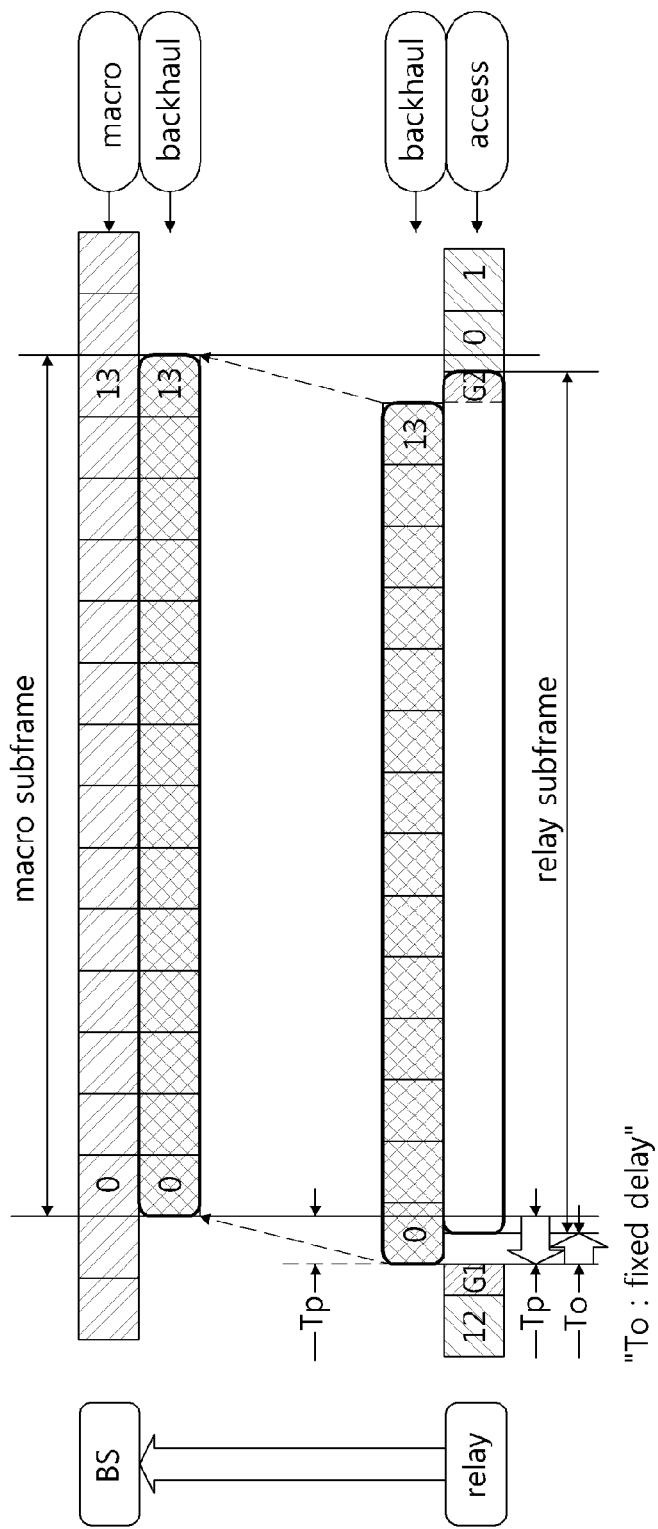
Figure 51:
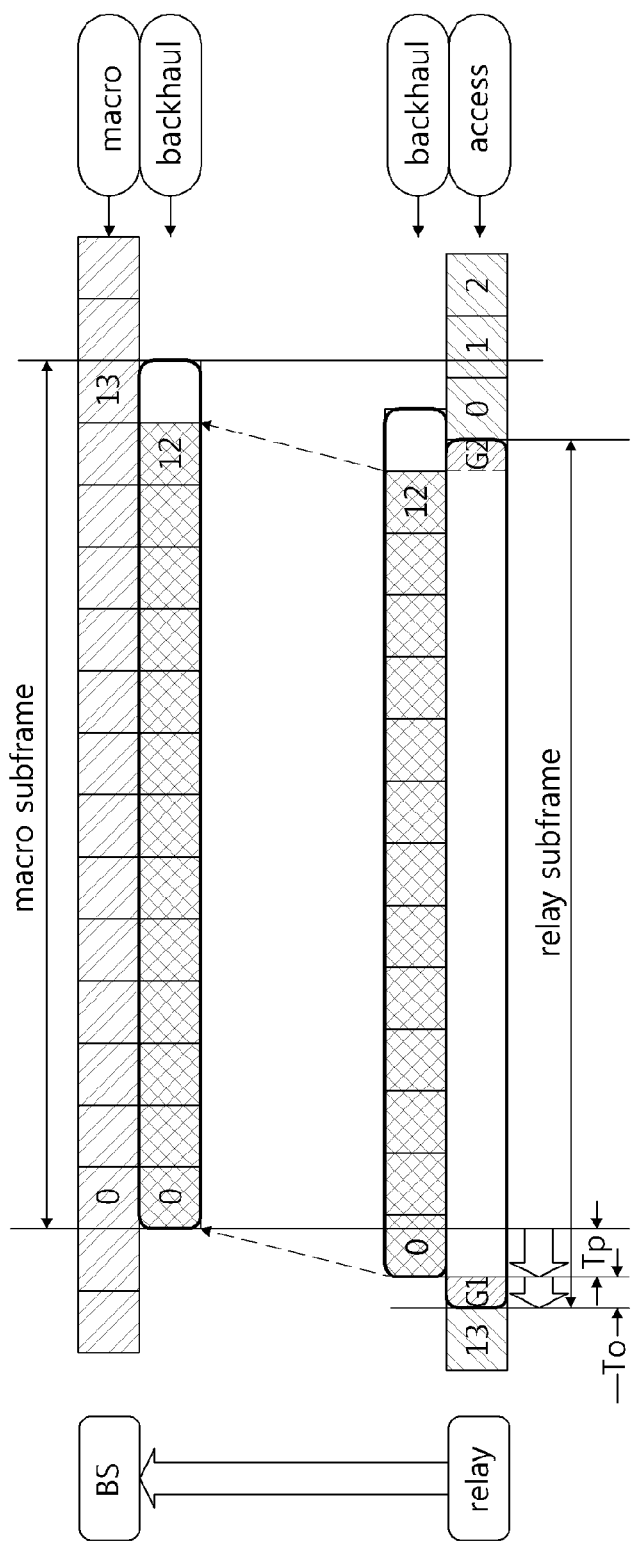

FIGS. 49 to 51 are conceptual diagrams illustrating a method for preventing waste of resources caused by allocating guard time. According to the schemes shown in FIGS. 49 to 51, a boundary of the RN backhaul UL subframe is not aligned with a boundary of the RN access link UL subframe, such that the resource utilization efficiency of the backhaul link can be increased. In more detail, a predetermined time offset (To) is additionally allocated to the legacy propagation delay (Tp) applied to the legacy RN access UL link subframe, such that the subframe boundary can be adjusted. The time offset (To) may indicate 'delay' or 'advance'. The time offset (To) may have a fixed value. In FIGS. 49 to 51, 'macro' indicates the macro UL subframe, 'backhaul' indicates the backhaul UL subframe, and 'access' indicates the RN access UL subframe.

FIG. 49 exemplarily shows that a fixed delay (To) is additionally applied to the legacy propagation delay (Tp) in association with the RN access UL subframe. Referring to FIG. 49, after the RN access UL subframe is completely received, the RN can transmit the backhaul UL subframe after lapse of a delay of the guard time (G1). Since the last symbol of the RN access UL subframe overlaps with the first symbol of the backhaul UL subframe, the backhaul UL subframe can be transmitted in the range from the 1-indexed symbol to the 13-indexed symbol (in case of the normal CP). Thereafter, upon completion of backhaul UL subframe transmission, the RN can receive the RN access UL subframe after lapse of a delay of the guard time (G2).

FIG. 50 exemplarily shows that a fixed delay (To) is additionally applied to the legacy propagation delay (Tp) in association with the RN access UL subframe, and the last symbol of the RN access UL subframe is punctured. Referring to FIG. 50, the last symbol punctured in the RN access UL subframe is used as guard times (G1, G2). In this case, the RN can transmit the entirety of the backhaul UL subframe without any loss.

FIG. 51 exemplarily shows that a fixed advance (To) is additionally applied to the legacy propagation delay (Tp) in association with the RN access UL subframe. Referring to FIG. 51, upon completion of the RN access UL subframe reception, the RN can transmit a backhaul UL subframe after lapse of a delay of the guard time (G1). Since the last symbol of the RN access UL subframe deviates from the first symbol of the backhaul UL subframe by a predetermined time corresponding to the guard time G1, the backhaul UL subframe can be transmitted in the range from the 0-idexed symbol to the 12-indexed symbol (in case of the normal CP). Thereafter, if transmission of the backhaul UL subframe is completed, the RN can receive the RN access UL subframe after lapse of a delay of the guard time G2.

Figure 52:
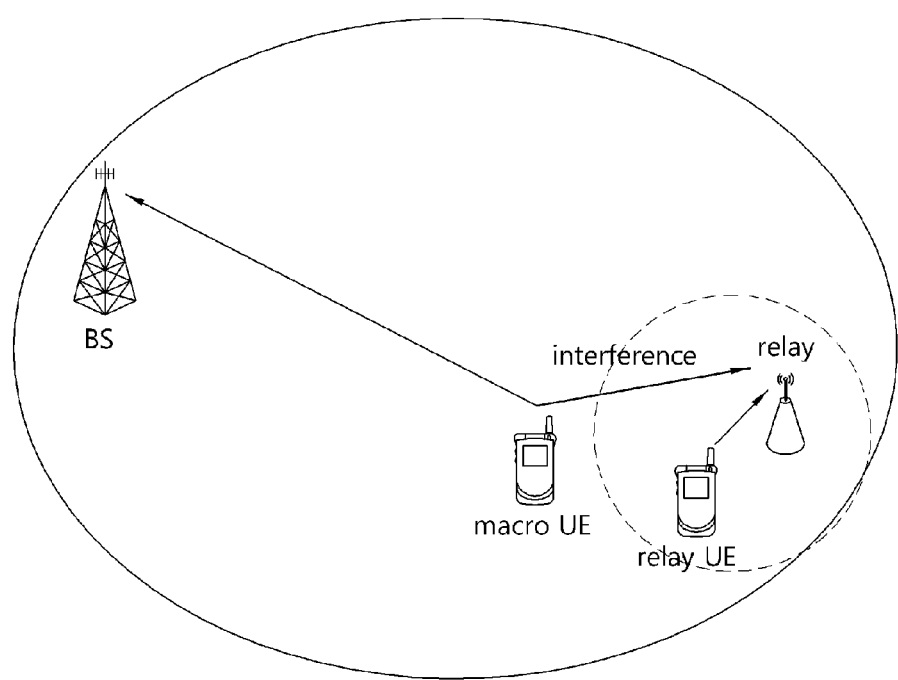
FIGS. 52 and 53 exemplarily show interference capable of being generated in a relay-node (RN) cell.
Figure 53:
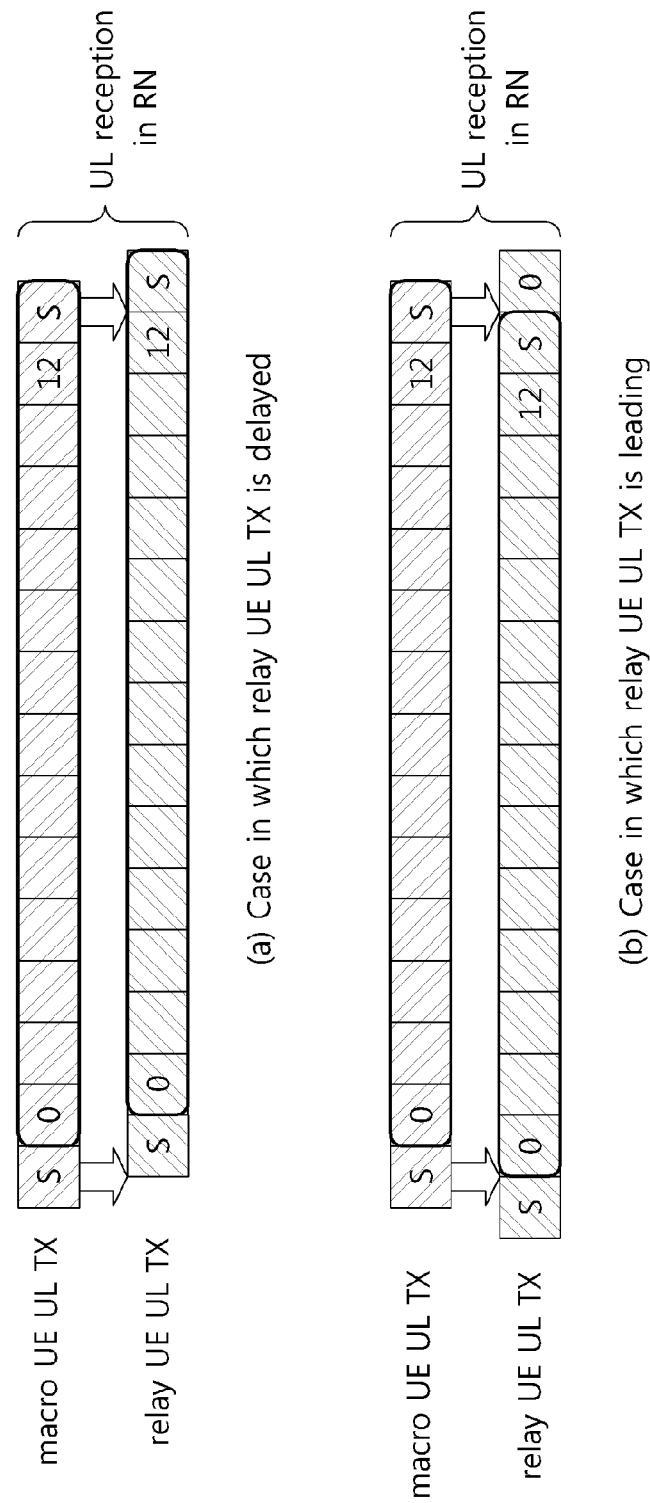

FIGS. 52 and 53 exemplarily show interference capable of being generated in a relay-node (RN) cell. The method of FIGS. 49 to 51 additionally applies a fixed delay or a fixed advance to the legacy propagation delay, such that the following problems are encountered.

Referring to FIG. 52, the UL transmission signal of the macro UE located close to the RN cell is stronger than the UL transmission signal of the RN UE, and the stronger UL transmission signal is received by the RN. From the viewpoint of the RN, the UL signal of the macro UE is considered to be an interference component, such that the smaller interference component is more beneficial to the RN. If delay or advance is intentionally applied to propagation delay during RN access UL subframe transmission, the macro UE UL signal and the RN UE UL signal in the RN reception signal are not synchronized with each other at the symbol level.

FIG. 53 exemplarily shows the above-mentioned interference problems. For convenience of description, FIG. 53 assumes that there is no propagation delay. As can be seen from FIG. 53(a), if UL transmission of the RN UE is delayed, SRS of the macro UE causes interference to the $12^{th}$ symbol and the $13^{rd}$ SRS. In contrast, if UL transmission of the RN UE is advanced, SRS of the macro UE affects the front part of the symbol #0 and some portion of the SRS of the RN UE, such that interference fluctuation may occur during one symbol duration.

Figure 54:
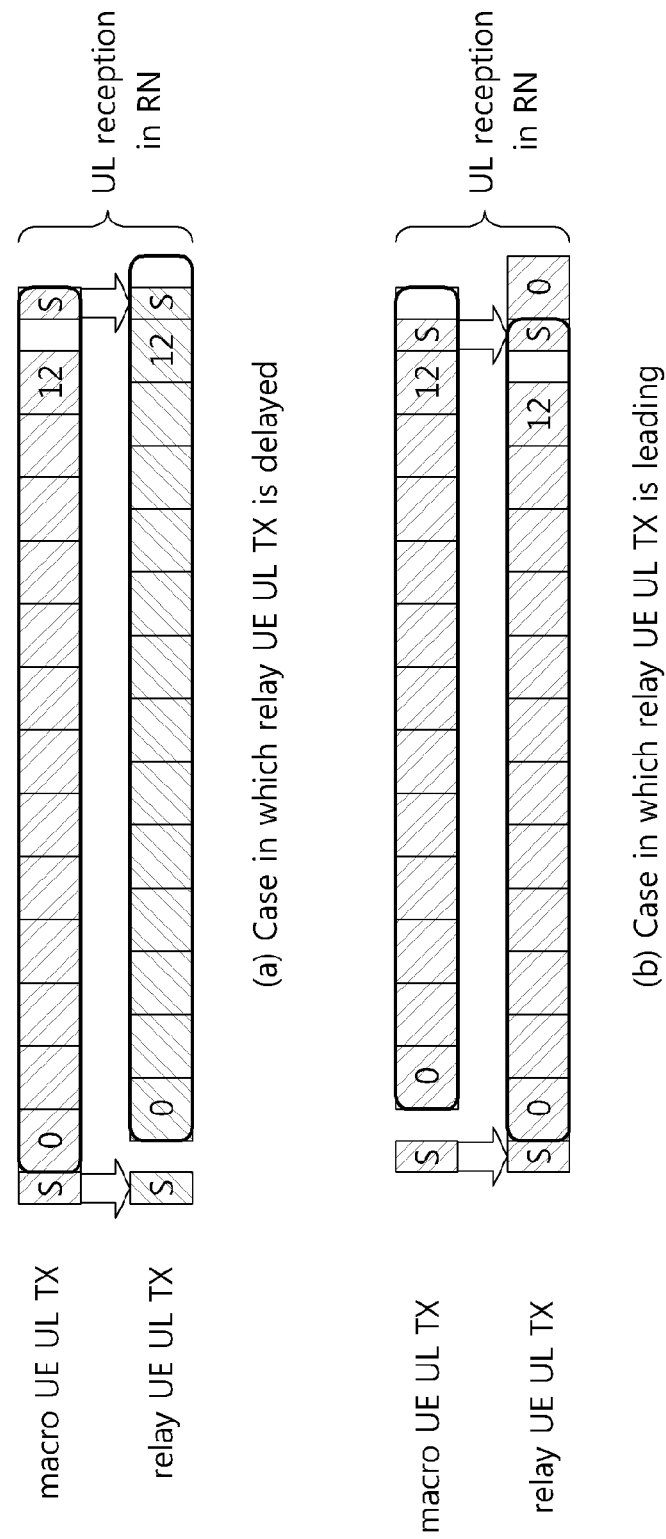
FIG. 54 is a conceptual diagram illustrating a method for transmitting a sounding reference signal (SRS) according to one embodiment of the present invention.

FIG. 54 is a conceptual diagram illustrating a method for solving the problems shown in FIGS. 52 and 53. In order to solve the above-mentioned problems, it is possible to utilize the above-mentioned SB SRS (e.g., ½ symbol-length SRS).

Referring to FIG. 54, if UL transmission of the RN UE is delayed, the macro UE transmits the SB SRS using the rear part of the last symbol. In contrast, the RN UE transmits the SB SRS using the front part of the last symbol as shown in FIG. 54(a). In this case, SRS of the macro UE and SRS of the RN UE are synchronized with each other in the UL reception signal of the RN. Similarly, if UL transmission of the RN UE is advanced, the macro UE transmits the SB SRS using the front part of the last symbol. In contrast, the RN UE transmits the SB SRS using the rear part of the last symbol as shown in FIG. 54(b). In this case, SRS of the macro UE and SRS of the RN UE are synchronized with each other in the UL reception signal of the RN.

The signaling method for the scheme shown in FIG. 54 will hereinafter be described in detail. For convenience of description, as can be seen from FIGS. 49 to 51, it is assumed that a specific timing case (e.g., forward shift or backward shift) is additionally established in the legacy propagation delay (Tp) in association with the RN access UL transmission, and a detailed description thereof will hereinafter be described from the viewpoint of the RN UE.

The RN UE can recognize setting of a specific timing case. Therefore, provided that SB SRS transmission is established and the specific timing case is recognized, the RN can always transmit the SB SRS at the UE-specific SRS subframe. In this case, the RN must inform the RN UE of specific information as to whether the transmission position of SB SRS is located at the front or rear part of the symbol. For this purpose, one-bit RRC (Radio Resource Control) signaling can be utilized. However, assuming that a specific timing case is established, the RN UE can infer the position of SB SRS located in the symbol from a specific timing case. In this case, additional signaling for indicating the position of SB SRS in the symbol is not required. If necessary, information indicating that SB SRS is to be used may be associated with a specific timing case. That is, if a specific timing case is established, SB SRS is always used. Otherwise, a normal SRS can be used.

On the other hand, it is impossible for the macro UE to recognize the setting of a specific timing case. Therefore, the macro UE must be informed of specific information as to whether the SB SRS is used, and the position of SB SRS located in the symbol. For example, one bit may be signaled to indicate whether the SB SRS is to be used, and another one bit may be signaled to indicate the position of SB SRS located in the symbol. The macro UE for which SB SRS transmission is required is located close to the RN cell, such that the above-mentioned indication information can be transmitted using UE(group)-specific signaling. For example, the above-mentioned indication information may be transmitted through UE(group)-specific higher layer signaling (e.g., RRC signaling), or may be transmitted from the BS to the macro UE through physical layer signaling (e.g., PDCCH).

Figure 55:
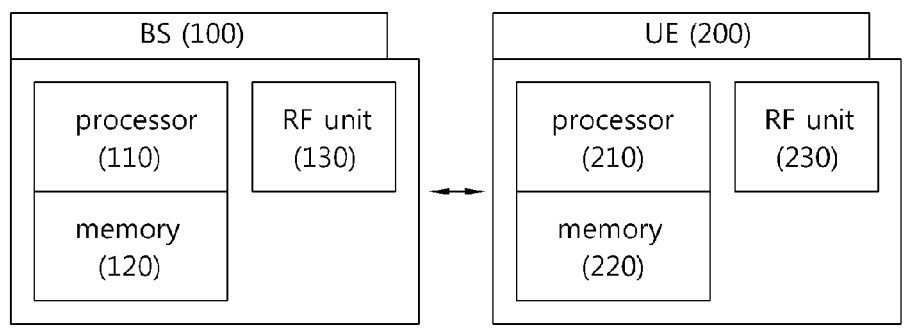
FIG. 55 is a block diagram illustrating a Base Station (BS) and a user equipment (UE) applicable to the embodiments of the present invention.

FIG. 55 is a block diagram illustrating a BS and a UE applicable to the embodiments of the present invention. For convenience of description, FIG. 55 shows two communication devices forming a link. In a backhaul link, the UE is replaced with the RN. In the RN access link, the BS is replaced with the RN.

The BS 100 includes a processor 110, a memory 120, a radio frequency (RF) unit 130. The processor 110 implements proposed functions, steps, and/or methods. That is, the BS transmits SRS parameters to the RN, and receives/demodulates the SRS transmitted from the RN using radio resources indicated by the SRS parameters. The function of the above-mentioned receiver may be implemented by the processor 110. The memory 120 is connected to the processor 110, such that it stores a variety of information for operating the processor 110. The RF unit 130 is connected to the processor 110 such that it transmits and/or receives RF signals.

The RN 200 includes the processor 210, the memory 220, and the RF unit 230. The processor 210 receives SRS parameters, allocates radio resources using the SRS parameters, and transmits the SRS to the BS through the radio resources. The function of the above-mentioned transmitter may be implemented by the processor 210. In addition, each layer of radio interface protocol can be implemented by the processor 210. The memory 220 is connected to the processor 210 such that it stores a variety of information for operating the processor 210. The RF unit 230 is connected to the processor 210 such that it transmits and/or receives RF signals.

The processor 110 or 210 may include an application-specific integrated circuit (ASIC), another chipset, a logic circuit, a data processing device, and/or a converter for mutually converting a baseband signal and an RF signal. The OFDM transmitter and the OFDM receiver shown in FIG. 7 may be implemented in the processor 110 or 210. The memory 120 or 220 may include a read-only memory (ROM), a random access memory (RAM), a flash memory, a memory card, a storage medium, and/or other storage device. The RF unit 130 or 230 may include at least one antenna for transmitting and/or receiving RF signals. If the embodiment according to the present invention is implemented by software, the above-mentioned scheme may be implemented by a module (procedure or function, etc.) which performs functions or operations as described above. The module may be stored in the memory 120 or 220 and then may be executed by the processor 110 or 210. The memory unit 120 or 220 may be located inside or outside the processor 110 or 210, and may be connected to the processor 110 or 210 through various well known means.

The aforementioned embodiments are achieved by combination of structural elements and features of the present invention in a predetermined fashion. Each of the structural elements or features should be considered to be selective unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS, a RN and a UE. A specific operation which has been described as being performed by the BS may be performed by an upper node of the BS as the case may be. In other words, it will be apparent that various operations performed for communication with the UE in the network which includes a plurality of network nodes along with the BS can be performed by the BS or network nodes other than the BS. The BS may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Exemplary embodiments of the present invention can be applied to a wireless communication system, and relate to a method and apparatus for transmitting a sounding reference signal (SRS).

The invention claimed is:

1. A method for transmitting an uplink reference signal at a user equipment (UE) in a wireless communication system comprising a relay node, the method comprising:
   receiving, by the UE, sounding reference signal (SRS) parameters;
   allocating, by the UE, radio resources using the sounding reference signal (SRS) parameters; and
   transmitting, by the UE, a sounding reference signal (SRS) using the radio resources,
   wherein, when a specific transmission timing offset is configured for the UE, the sounding reference signal (SRS)

is transmitted using only a portion of a single carrier-frequency division multiple access (SC-FDMA) symbol, and wherein, when the specific transmission timing offset is not configured for the UE, the sounding reference signal (SRS) is transmitted using the SC-FDMA symbol.

2. The method according to claim 1, wherein, when the specific transmission timing offset is configured for the UE, the sounding reference signal (SRS) is transmitted using one of half portions of the SC-FDMA symbol.

3. The method according to claim 2, wherein the sounding reference signal (SRS) is transmitted using a front half portion of the SC-FDMA symbol, and the front half portion is comprised of a short block (SB) having subcarrier spacing that is two times larger than that of a symbol including no SRS.

4. The method according to claim 2, wherein the sounding reference signal (SRS) is transmitted using a rear half portion of the SC-FDMA symbol, and the rear half portion is comprised of a short block (SB) having subcarrier spacing that is two times larger than that of a symbol including no SRS.

5. The method according to claim 1, wherein the SRS parameters include a parameter indicating
   a frequency band in which the sounding reference signal (SRS) is transmitted, and
   whether the frequency band is all or some of a system band.

6. The method according to claim 1, wherein the SC-FDMA symbol is the last SC-FDMA symbol of a subframe.

7. The method according to claim 1, further comprising:
   receiving information indicating a position of the sounding reference signal (SRS) in the SC-FDMA symbol.

8. A method for receiving an uplink reference signal at a network node in a wireless communication system comprising a relay node, the method comprising:
   transmitting sounding reference signal (SRS) parameters to a user equipment (UE); and
   receiving a sounding reference signal (SRS) from the user equipment (UE) using radio resources indicated by the sounding reference signal (SRS) parameters,
   wherein, when a specific transmission timing offset is configured for the UE, the sounding reference signal (SRS) is received using only a portion of a single carrier-frequency division multiple access (SC-FDMA) symbol, and
   wherein, when the specific transmission timing offset is not configured for the UE, the sounding reference signal (SRS) is received using the SC-FDMA symbol.

9. The method according to claim 8, wherein the sounding reference signal (SRS) is received using one of half portions of the SC-FDMA symbol.

10. The method according to claim 9, wherein the sounding reference signal (SRS) is received using a front half portion of the SC-FDMA symbol, and the front half portion is comprised of a short block (SB) having subcarrier spacing that is two times larger than that of a symbol including no SRS.

11. The method according to claim 9, wherein the sounding reference signal (SRS) is received using a rear half portion of the SC-FDMA symbol, and the rear half portion is comprised of a short block (SB) having subcarrier spacing that is two times larger than that of a symbol including no SRS.

12. The method according to claim 8, wherein the SRS parameters include a parameter indicating
   a frequency band in which the sounding reference signal (SRS) is transmitted, and
   whether the frequency band is all or some of a system band.

13. The method according to claim 8, wherein the SC-FDMA symbol is the last SC-FDMA symbol of a subframe.

14. The method according to claim 8, further comprising receiving information indicating a position of the sounding reference signal (SRS) in the SC-FDMA symbol.

15. A user equipment (UE) comprising:
   a radio frequency (RF) unit for transmitting/receiving a radio frequency (RF) signal; and
   a processor connected to the RF unit and configured to
     receive sounding reference signal (SRS) parameters,
     allocate radio resources using the sounding reference signal (SRS) parameters, and
     transmit a sounding reference signal (SRS) using the radio resources,
   wherein, when a specific transmission timing offset is configured for the UE, the sounding reference signal (SRS) is transmitted using only a portion of a single carrier-frequency division multiple access (SC-FDMA) symbol, and
   wherein, when the specific transmission timing offset is not configured for the UE, the sounding reference signal (SRS) is transmitted using the SC-FDMA symbol.

* * * * *